US008625839B2

(12) United States Patent
Grill et al.

(10) Patent No.: US 8,625,839 B2
(45) Date of Patent: Jan. 7, 2014

(54) EMBEDDER FOR EMBEDDING A WATERMARK INTO AN INFORMATION REPRESENTATION, DETECTOR FOR DETECTING A WATERMARK IN AN INFORMATION REPRESENTATION, METHOD AND COMPUTER PROGRAM AND INFORMATION SIGNAL

(75) Inventors: Bernhard Grill, Lauf (DE); Ernst Eberlein, Grossenseebach (DE); Stefan Kraegeloh, Erlangen (DE); Joerg Pickel, Happurg (DE); Juliane Borsum, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 192 days.

(21) Appl. No.: 12/922,644

(22) PCT Filed: Mar. 3, 2009

(86) PCT No.: PCT/EP2009/001505
§ 371 (c)(1),
(2), (4) Date: Dec. 2, 2010

(87) PCT Pub. No.: WO2009/112184
PCT Pub. Date: Sep. 17, 2009

(65) Prior Publication Data
US 2011/0164784 A1    Jul. 7, 2011

(30) Foreign Application Priority Data

Mar. 14, 2008 (DE) .......................... 10 2008 014 311

(51) Int. Cl.
*G06K 9/00* (2006.01)
(52) U.S. Cl.
USPC ............... 382/100; 713/176; 380/46; 380/54; 382/250

(58) Field of Classification Search
USPC ............... 382/100, 250; 713/176; 380/46, 54
See application file for complete search history.

(56) References Cited

U.S. PATENT DOCUMENTS 6,370,258 B1 * 4/2002 Uchida ......................... 382/100
6,400,826 B1 * 6/2002 Chen et al. ................... 382/100
(Continued)

FOREIGN PATENT DOCUMENTS

| JP | 2000182324 | 6/2000 |
| JP | 2001144935 | 5/2001 |

(Continued)

OTHER PUBLICATIONS

Hua, et al., "Public Multiple Watermarking Resistant to Cropping", Proc. of the 6th Int'l Conference on Pattern Recognition and Information Processing, XP007908553, May 18, 2001, 6 pages.

(Continued)

*Primary Examiner* — Jayesh A Patel
*Assistant Examiner* — Iman K Kholdebarin
(74) *Attorney, Agent, or Firm* — Michael A. Glenn; Perkins Coie LLP

(57) ABSTRACT

An embedder for embedding a watermark to be embedded into an input information representation comprises an information adder, which is implemented to provide the input information representation with the watermark and additional information to be added to obtain an input information representation provided with the watermark and the additional information. The additional information to be added comprises descriptive information describing the embedding of the at least one watermark into the input information representation.

29 Claims, 21 Drawing Sheets

(56) References Cited

U.S. PATENT DOCUMENTS

| | | | |
|---|---|---|---|
| 6,954,856 B1* | 10/2005 | Kohashi et al. | 713/176 |
| 7,006,630 B2* | 2/2006 | Yu et al. | 380/201 |
| 7,058,196 B2* | 6/2006 | Takaragi | 382/100 |
| 7,113,615 B2 | 9/2006 | Rhoads et al. | |
| 7,158,654 B2 | 1/2007 | Rhoads | |
| 7,174,030 B2* | 2/2007 | Sugahara et al. | 382/100 |
| 7,181,017 B1* | 2/2007 | Nagel et al. | 380/282 |
| 7,191,334 B1 | 3/2007 | Kalker | |
| 7,231,062 B2* | 6/2007 | Zhang et al. | 382/100 |
| 7,471,807 B2* | 12/2008 | Asano et al. | 382/100 |
| 7,660,991 B2* | 2/2010 | Nakamura et al. | 713/176 |
| 7,840,005 B2* | 11/2010 | Delp et al. | 380/201 |
| 8,045,748 B2* | 10/2011 | Levy | 382/100 |
| 8,205,086 B2* | 6/2012 | Maeno | 713/176 |
| 2001/0033674 A1* | 10/2001 | Chen et al. | 382/100 |
| 2002/0150247 A1 | 10/2002 | Linnartz et al. | |
| 2002/0168088 A1* | 11/2002 | Linnartz et al. | 382/100 |
| 2003/0161498 A1* | 8/2003 | Oami | 382/100 |
| 2004/0001608 A1* | 1/2004 | Rhoads | 382/100 |
| 2006/0239502 A1 | 10/2006 | Petrovic et al. | |
| 2007/0165852 A1* | 7/2007 | Roberts | 380/201 |
| 2007/0274561 A1 | 11/2007 | Rhoads | |
| 2007/0294173 A1* | 12/2007 | Levy et al. | 705/51 |
| 2008/0022134 A1 | 1/2008 | Wang | |
| 2008/0226125 A1* | 9/2008 | Van Leest | 382/100 |
| 2011/0144998 A1 | 6/2011 | Grill et al. | |

FOREIGN PATENT DOCUMENTS

| | | |
|---|---|---|
| JP | 2001223880 | 8/2001 |
| JP | 2002521885 | 7/2002 |
| JP | 2003060884 | 2/2003 |
| RU | 2208301 | 7/2003 |
| RU | 2243600 | 12/2004 |
| RU | 2289215 | 12/2006 |
| WO | WO-99/60791 | 11/1999 |
| WO | WO-0004727 A2 | 1/2000 |
| WO | WO-0217214 A2 | 2/2002 |

OTHER PUBLICATIONS

Lie, et al, "Robust Image Watermarking on the DCT Domain", Information Symposium on Circuits and Systems, Geneva, Switzerland, May 2000, 4 pages.

Loytynoja, et al., "Hash-based Counter Scheme for Digital Rights Management", IEEE Int'l Conference on Multimedia, Piscataway, NJ, USA, Jul. 2005, 4 pages.

Cvejic, Nedeljko et al, "Audio Watermarking Using m-Sequences and Temporal Masking", Applications of Signal Processing to Audio and Acoustiscs. 2001 IEEE Workshop. Piscataway, NJ, USA., Oct. 21, 2001, 227-230.

Wen-Nung, et al., "Robust Image Watermarking on the DCT Domain", Dept. of Electrical Eng., National Chung Cheng University; Taiwain, ROC; May 2000, 1/228-1/230.

* cited by examiner

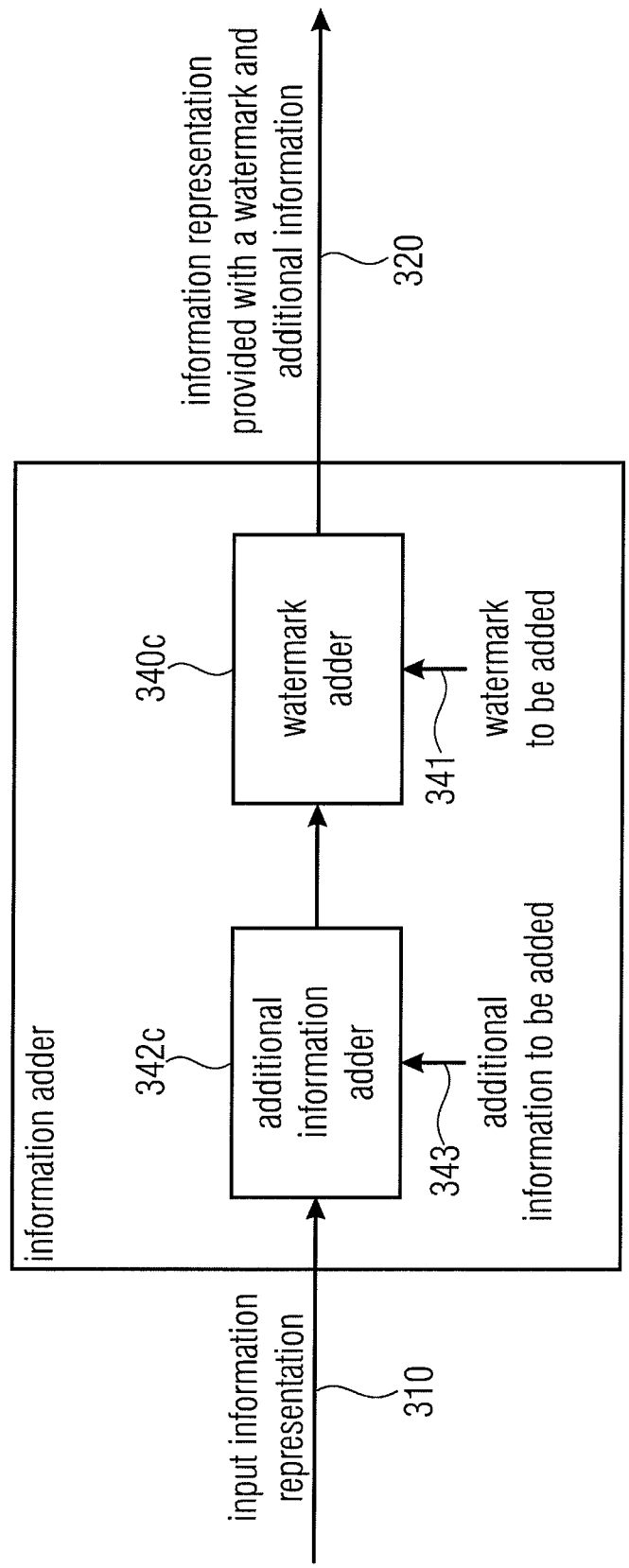

EMBEDDER FOR EMBEDDING A WATERMARK INTO AN INFORMATION REPRESENTATION, DETECTOR FOR DETECTING A WATERMARK IN AN INFORMATION REPRESENTATION, METHOD AND COMPUTER PROGRAM AND INFORMATION SIGNAL

CROSS-REFERENCE TO RELATED APPLICATION

This application is a U.S. National Phase entry of PCT/EP2009/001505 filed Mar. 3, 2009, and claims priority to German Patent Application No. 102008014311.1 filed Mar. 14, 2008, each of which is incorporated herein by references hereto.

BACKGROUND OF THE INVENTION

Embodiments of the present invention relate to embedders for embedding a watermark into an information representation, to detectors for detecting a watermark in an information representation, to methods for embedding a watermark into an information representation, to methods for detecting a watermark in an information representation, to corresponding computer programs and to an information signal.

Some embodiments of the present invention relate to devices and methods for repeated watermark embedding and watermark extraction.

In many fields of information processing, it is desirable today to add a watermark to the information. A watermark is, for example, a piece of information which may be added to the actual useful information without substantially interfering with the actual information. When adding a watermark, for example the data format of the useful information may be maintained, for example by overlaying the watermark onto the useful information. In some known methods, overlaying the watermark onto the useful information is executed such that an interference with the useful information is kept so low that, for example, it does not interfere, or only very weakly, in a reproduction of the useful information.

Watermarks may, for example, be added to an information representation which represents an audio signal. Further, watermarks may, for example, be added to an information representation representing a video signal. A watermark may, however, also be added to an information representation, for example representing a computer program. Still further information representations representing different data forms may be provided with a watermark.

Special challenges result when several watermarks are to be embedded into one single useful information. In this case, frequently a mutual influencing of the watermark results, whereby in some case detection is made more difficult or even impossible. The mutual influencing of the watermarks may further lead to an interference of the actual useful information becoming unacceptably high.

Further, in some conventional methods the effort necessitated to extract several watermarks from an information representation is strongly increased.

SUMMARY

According to an embodiment, an embedder for embedding a watermark to be embedded into an input information representation representing an audio signal, or representing a video signal, or representing a computer program, or representing an image, or representing a text, may have: an information adder implemented to provide the input information representation with the watermark to be embedded and additional information to be added to obtain an information representation provided with the watermark to be embedded and the additional information to be added, wherein the additional information to be added includes descriptive information describing the embedding of at least one watermark into the information representation provided with the watermark to be embedded and the additional information; wherein the embedder is implemented to provide the input information representation with the additional information to be added such that the additional information to be added carries information on how many watermarks are contained in the information representation provided with the watermark to be embedded and the additional information to be added.

According to another embodiment, an embedder for embedding a watermark to be embedded into an input information representation representing an audio signal, or representing a video signal, or representing a computer program, or representing an image, or representing a text, may have: an information adder implemented to provide the input information representation with the watermark to be embedded and additional information to be added to obtain an information representation provided with the watermark to be embedded and the additional information to be added, wherein the additional information to be added includes descriptive information describing the embedding of at least one watermark into the information representation provided with the watermark to be embedded and the additional information; wherein the embedder includes a watermark information detector, which is implemented to detect an existence of a watermark in the input information representation, and to provide information on an existence of a watermark in the input information representation; and wherein the embedder is implemented to determine the additional information to be added depending on the information on the existence of a watermark in the input information representation.

According to another embodiment, an embedder for embedding a watermark to be embedded into an input information representation representing an audio signal, or representing a video signal, or representing a computer program, or representing an image, or representing a text, may have: an information adder implemented to provide the input information representation with the watermark to be embedded and additional information to be added to obtain an information representation provided with the watermark to be embedded and the additional information to be added, wherein the additional information to be added includes descriptive information describing the embedding of at least one watermark into the information representation provided with the watermark to be embedded and the additional information; wherein the information adder is implemented to add the additional information to be added to the input information representation in the same embedding format in which additional information already existing in the input information representation exists.

According to another embodiment, an embedder for embedding a watermark to be embedded into an input information representation representing an audio signal, or representing a video signal, or representing a computer program, or representing an image, or representing a text, may have: an information adder implemented to provide the input information representation with the watermark to be embedded and additional information to be added to obtain an information representation provided with the watermark to be embedded and the additional information to be added, wherein the additional information to be added includes descriptive information describing the embedding of at least one watermark into the information representation provided with the watermark to be embedded and the additional information; wherein the embedder includes a watermark information detector, which is implemented to detect watermark information already contained in the input information representation, and wherein the information adder is implemented to provide the input information representation with the watermark, depending on the watermark information detected by the watermark information detector.

According to another embodiment, an embedder for embedding a watermark to be embedded into an input information representation representing an audio signal, or representing a video signal, or representing a computer program, or representing an image, or representing a text, may have: an information adder implemented to provide the input information representation with the watermark to be embedded and additional information to be added to obtain an information representation provided with the watermark to be embedded and the additional information to be added, wherein the additional information to be added includes descriptive information describing the embedding of at least one watermark into the information representation provided with the watermark to be embedded and the additional information; wherein the embedder is implemented to select resources for embedding the watermark to be embedded depending on information on a number of watermarks already contained in the input information representation.

According to another embodiment of the invention, a detector for detecting at least one watermark in an input information representation representing an audio signal, or representing a video signal, or representing a computer program, or representing an image, or representing a text, may have: an embedding information extractor, which is implemented to extract, from the input information representation, embedding information including descriptive information with regard to the embedding of at least one watermark into the input information representation; and a watermark extractor, which is implemented to extract one or several watermarks contained in the input information representation depending on the embedding information; wherein the embedding information extractor is implemented to detect, as embedding information, additional information in the information representation including information on a number of watermarks embedded in the information representation, and wherein the detector is implemented to determine, depending on the additional information, how many watermarks are to be extracted from the input information representation.

According to another embodiment of the invention, a method of embedding a watermark to be embedded into an input information representation representing an audio signal, or representing a video signal, or representing a computer program, or representing an image, or representing a text, may have the steps of: providing the input information representation with a watermark and additional information to be added to obtain an information representation provided with the watermark and additional information to be added, wherein the additional information to be added includes descriptive information with regard to embedding at least one watermark into the input information representation; wherein the input information representation is provided with the additional information to be added such that the additional information to be added carries information on how many watermarks are contained in the information representation provided with the watermark to be embedded and the additional information to be added.

According to another embodiment, a method of embedding a watermark to be embedded into an input information representation representing an audio signal, or representing a video signal, or representing a computer program, or representing an image, or representing a text, may have the steps of: providing the input information representation with a watermark and additional information to be added to obtain an information representation provided with the watermark and additional information to be added, wherein the additional information to be added includes descriptive information with regard to embedding at least one watermark into the input information representation; wherein an existence of a watermark is detected in the input information representation, and information on an existence of a watermark in the input information representation is provided; and wherein the additional information to be added is determined depending on the information on the existence of a watermark in the input information representation.

According to another embodiment, a method of embedding a watermark to be embedded into an input information representation representing an audio signal, or representing a video signal, or representing a computer program, or representing an image, or representing a text, may have the steps of: providing the input information representation with a watermark and additional information to be added to obtain an information representation provided with the watermark and additional information to be added, wherein the additional information to be added includes descriptive information with regard to embedding at least one watermark into the input information representation; wherein the additional information to be added is added to the input information representation in the same embedding format in which additional information already existing in the input information representation exists.

According to another embodiment, a method of embedding a watermark to be embedded into an input information representation representing an audio signal, or representing a video signal, or representing a computer program, or representing an image, or representing a text, may have the steps of: providing the input information representation with a watermark and additional information to be added to obtain an information representation provided with the watermark and additional information to be added, wherein the additional information to be added includes descriptive information with regard to embedding at least one watermark into the input information representation; wherein watermark information already contained in the input information representation is detected, and wherein the input information representation is provided with the watermark, depending on the detected watermark information.

According to another embodiment, a method of embedding a watermark to be embedded into an input information representation representing an audio signal, or representing a video signal, or representing a computer program, or representing an image, or representing a text, may have the steps of: providing the input information representation with a watermark and additional information to be added to obtain an information representation provided with the watermark and additional information to be added, wherein the additional information to be added includes descriptive information with regard to embedding at least one watermark into the input information representation; wherein resources for embedding the watermark to be embedded are selected depending on information on a number of watermarks already contained in the input information representation.

According to another embodiment, a method of detecting at least one watermark in an input information representation representing an audio signal, or representing a video signal, or representing a computer program, or representing an image, or representing a text, may have the steps of: extracting embedding information including descriptive information with regard to the embedding of at least one watermark into the input information representation, from the input information representation; and extracting one or several watermarks contained in the input information representation depending on the embedding information; wherein, as embedding information, additional information in the information representation is detected, including information on a number of watermarks embedded in the input information representation, and wherein it is determined, depending on the additional information, how many watermarks are to be extracted from the input information representation.

Another embodiment may have an information signal, having at least one watermark and one descriptive information with regard to the embedding of the at least one watermark into the information signal; wherein the information signal includes an audio signal, an image signal, a text signal or a computer program signal; and wherein the descriptive information carries information on how many watermarks are contained in the information signal.

According to another embodiment, an embedder for embedding a watermark to be embedded into an input information representation representing an audio signal, or representing a video signal, or representing a computer program, or representing an image, or representing a text, may have: an information adder implemented to provide the input information representation with the watermark to be embedded and additional information to be added to obtain an information representation provided with the watermark to be embedded and the additional information to be added, wherein the additional information to be added includes descriptive information describing the embedding of at least one watermark into the information representation provided with the watermark to be embedded and the additional information; wherein the information adder is implemented to add the additional information to be added in a timeslot following synchronization information contained in the input information representation.

According to another embodiment, a detector for detecting at least one watermark in an input information representation representing an audio signal, or representing a video signal, or representing a computer program, or representing an image, or representing a text, may have: an embedding information extractor, which is implemented to extract, from the input information representation, embedding information including descriptive information with regard to the embedding of at least one watermark into the input information representation; and a watermark extractor, which is implemented to extract one or several watermarks contained in the input information representation depending on the embedding information; wherein the embedding information extractor is implemented to identify several embedding information units in the input information representation, wherein the embedding information units are allocated to different watermark embeddings in the input information representation; and wherein the embedding information extractor is implemented to select a latest embedding information unit from the plurality of identified embedding information units, and to derive the additional information from the latest embedding information unit.

According to another embodiment, a detector for detecting at least one watermark in an input information representation representing an audio signal, or representing a video signal, or representing a computer program, or representing an image, or representing a text, may have: an embedding information extractor, which is implemented to extract, from the input information representation, embedding information including descriptive information with regard to the embedding of at least one watermark into the input information representation; and a watermark extractor, which is implemented to extract one or several watermarks contained in the input information representation, depending on the embedding information; wherein the embedding information extractor is implemented to extract, as the embedding information, a watermark number belonging to the watermark to be extracted, from the input information representation; wherein the detector includes a detection parameter determiner, which is implemented to apply a derivation function, depending on the watermark number, once or several times, to an initial value to obtain an extraction parameter for extracting the watermark to be extracted from the input information representation; and wherein the watermark extractor is implemented to extract the watermark to be extracted using the extraction parameter from the input information representation.

According to another embodiment, a method of embedding a watermark to be embedded into an input information representation representing an audio signal, or representing a video signal, or representing a computer program, or representing an image, or representing a text, may have the steps of: providing the input information representation with a watermark and additional information to be added to obtain an information representation provided with the watermark and additional information to be added, wherein the additional information to be added includes descriptive information with regard to embedding at least one watermark into the input information representation; wherein the additional information to be added is added in a timeslot following synchronization information contained in the input information representation.

According to another embodiment, a method of detecting at least one watermark in an input information representation representing an audio signal, or representing a video signal, or representing a computer program, or representing an image, or representing a text, may have the steps of: extracting embedding information including descriptive information with regard to the embedding of at least one watermark into the input information representation, from the input information representation; and extracting one or several watermarks contained in the input information representation depending on the embedding information; wherein several embedding information units are identified in the input information representation, wherein the embedding information units are allocated to different watermark embeddings in the input information representation; and wherein a latest embedding information unit is selected from the plurality of identified embedding information units, and the additional information is derived from the latest embedding information unit.

According to another embodiment, a method of detecting at least one watermark in an input information representation representing an audio signal, or representing a video signal, or representing a computer program, or representing an image, or representing a text, may have the steps of: extracting embedding information including descriptive information with regard to the embedding of at least one watermark into the input information representation, from the input information representation; and extracting one or several watermarks contained in the input information representation, depending on the embedding information; wherein, as the embedding information, a watermark number belonging to the watermark to be extracted is extracted from the input information representation; wherein, depending on the watermark number, a derivation function is applied, once or several times, to an initial value to obtain an extraction parameter for extracting the watermark to be extracted from the input information representation; and wherein the watermark to be extracted is extracted using the extraction parameter from the input information representation.

Another embodiment may have a computer program for performing the inventive methods, when the computer program runs on a computer.

Another embodiment may have an information signal, having at least one watermark and one descriptive information with regard to the embedding of the at least one watermark into the information signal, wherein the information signal includes an audio signal, an image signal, a text signal or a computer program signal; and wherein the descriptive information is added in a timeslot following synchronization information contained in the input information representation.

According to one aspect, the present invention provides an embedder for embedding a watermark to be embedded into an input information representation having an information adder which is implemented to provide the input information representation with the watermark and an additional information to be added, to obtain an information representation provided with the watermark and the additional information to be added. The additional information to be added includes a descriptive information regarding an embedding of at least one watermark into the input information representation.

The mentioned aspect is based on the finding that an extraction of a watermark embedded into the information representation by a descriptive information describing the embedding of at least one watermark into the input information representation may be facilitated. By adding the additional information, thus, within the information representation provided with the watermark to be embedded, information is provided which may be used by a watermark detector for controlling the watermark detection and/or watermark extraction. The describing additional information may, for example, carry information about whether, how, when or from whom the watermark was added to the input information representation. Thus, the additional information may serve a watermark detector or watermark extractor for deciding whether the watermark is to be extracted and/or in which way (e.g. using which detection parameters) the watermark is to be extracted. The presence of the additional information describing the embedding of a watermark into the information representation provided with the watermark may, for example, make it unnecessary to search the information representation provided with the watermark to be embedded for any possible watermarks known to the watermark detector. Rather, the watermark detector may, for example, already detect, using the additional information, which watermarks are contained at all in the information representation provided with the watermark. Thus, the watermark detector may, for example, accordingly narrow a search, whereby the effort in the search for watermarks in the watermark detector is considerably reduced. The additional information may further include, for example, information on resources used in the embedding (e.g. frequency resources, time resources or code resources), so that, in the detection of a watermark in the information representation provided with the watermark to be embedded, the detector may evaluate the additional information to set detection parameters suitably and/or pointedly for a detection of the watermark to be detected.

The additional information may further, for example, carry information about how many watermarks are embedded in the information representation. Thus, for example a watermark detector, after evaluating the corresponding information, may obtain a termination criterion, so that the watermark detector may, for example, terminate a search for watermarks when so many watermarks have been found as are described by the additional information.

In summary it may thus be stated that, by adding additional information describing the embedding of watermarks into the input information representation or into the information representation provided with the watermark to be embedded, efficiency in the detection of watermarks may be substantially improved in a watermark detector.

Accordingly, according to a further aspect, the present invention provides a detector for detecting at least one watermark in an input information representation, wherein the detector comprises an embedding information extractor which is implemented to extract embedding information including descriptive information regarding the embedding of at least one watermark into the input information representation (or into the information representation provided with the watermark) from the information representation. The corresponding detector further includes a watermark extractor which is implemented to extract one or several watermarks contained in the input information representation depending on the embedding information.

The corresponding detector is, for example, able to extract the additional information added by the above-described embedder to the information representation as embedding information from the information representation and to control the watermark extraction depending on the embedding information. Thus, the mentioned detector is, for example, able to use the additional information and to realize the advantages described above with reference to the corresponding embedder.

According to some further embodiments, the present invention provides an information signal including at least one watermark and a descriptive information regarding the embedding of the at least one watermark into the information signal. The corresponding information signal, due to the presence of the descriptive information regarding the embedding of the at least one watermark into the information signal, enables a substantially easier (for example faster or more resource-economical) extraction of the watermark embedded into the information signal than is conventionally possible.

BRIEF DESCRIPTION OF THE DRAWINGS

Embodiments of the present invention will be detailed subsequently referring to the appended drawings, in which:

FIG. 3c shows a block diagram of a watermark embedder according to an embodiment of the invention;

DETAILED DESCRIPTION OF THE INVENTION

Figure 1:
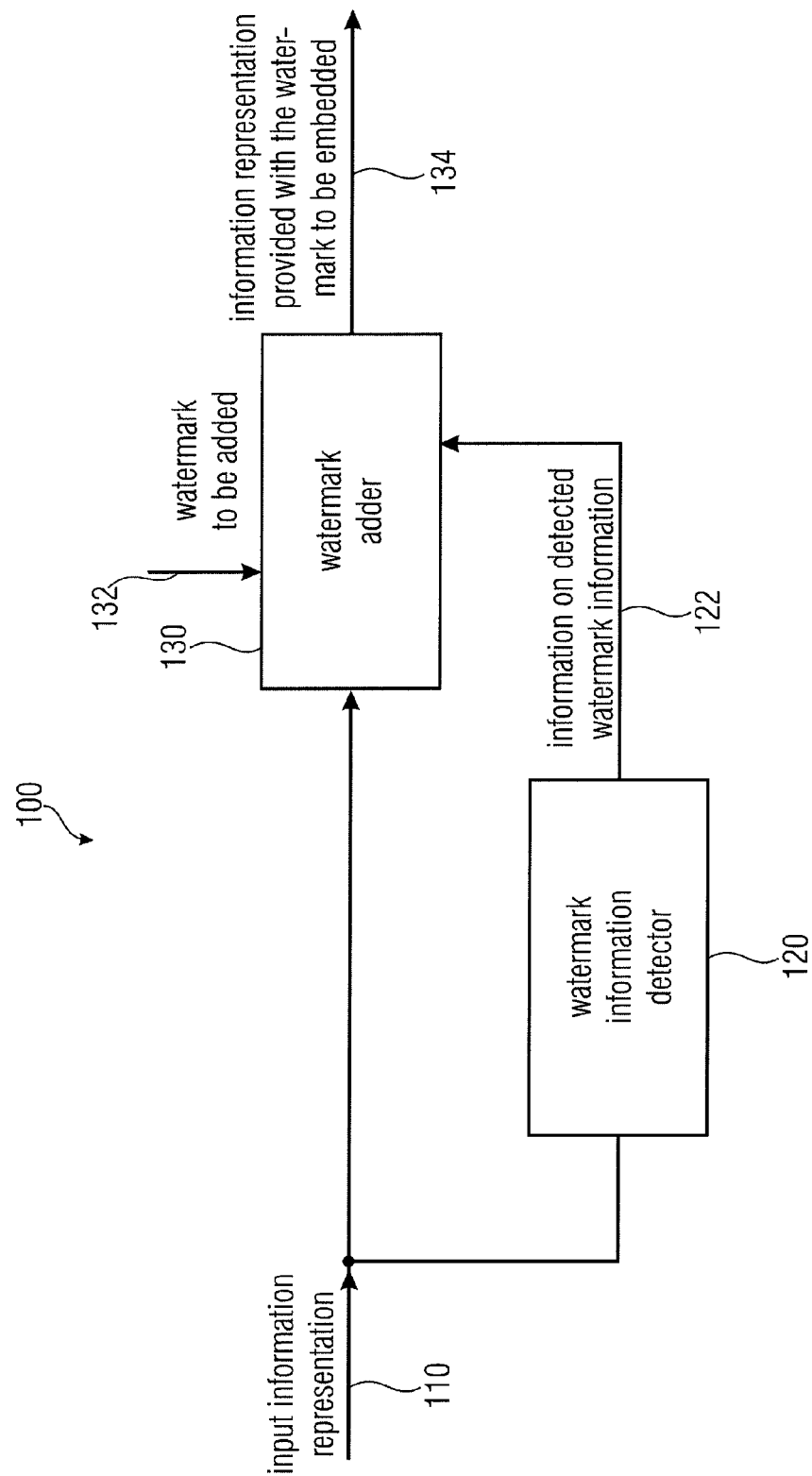
FIG. 1 shows a block diagram of a watermark embedder according to an embodiment of the invention.

FIG. 1 shows a block diagram of an embedder for embedding a watermark to be embedded or to be added into an input information representation. The embedder according to FIG. 1 is designated by 100 in its entirety. The embedder 100 is implemented to receive an input information representation 110. The embedder 100 includes a watermark information detector 120 which is implemented to detect watermark information already contained in the input information representation 110. Thus, the watermark information detector 120 for example provides information 122 about watermark information detected in the input information representation 110. The embedder 100 further includes a watermark adder 130 which is implemented to provide the input information representation 110, depending on the watermark information detected by the watermark information detector 120, with a watermark 132 to be added, to obtain an information representation 134 provided with the watermark 132 to be embedded. The watermark adder 130 may thus, for example, be implemented to receive the input information representation 110 and the information 122 from the watermark information detector 120. Further, the watermark adder 130 may, for example, be implemented to receive the watermark 132 to be added. The watermark 132 to be added may, however, also be firmly stored in the watermark adder 130.

Regarding the functioning of the embedder 100, it is to be noted that the watermark adder 130 may add the watermark 132 to be added depending on the watermark information already contained in the input information representation 110, to the input information representation 110. The embedder 100 thus enables the watermark 132 to be added to be added to the input information representation 110 not in a random way but considering the watermark already contained in the input information representation 110.

Regarding the way in which the watermark already contained in the input information representation 110 is considered by the watermark adder 130, different possibilities exist which are explained in the following, for example with reference to FIGS. 7a-7d in more detail.

Figure 2:
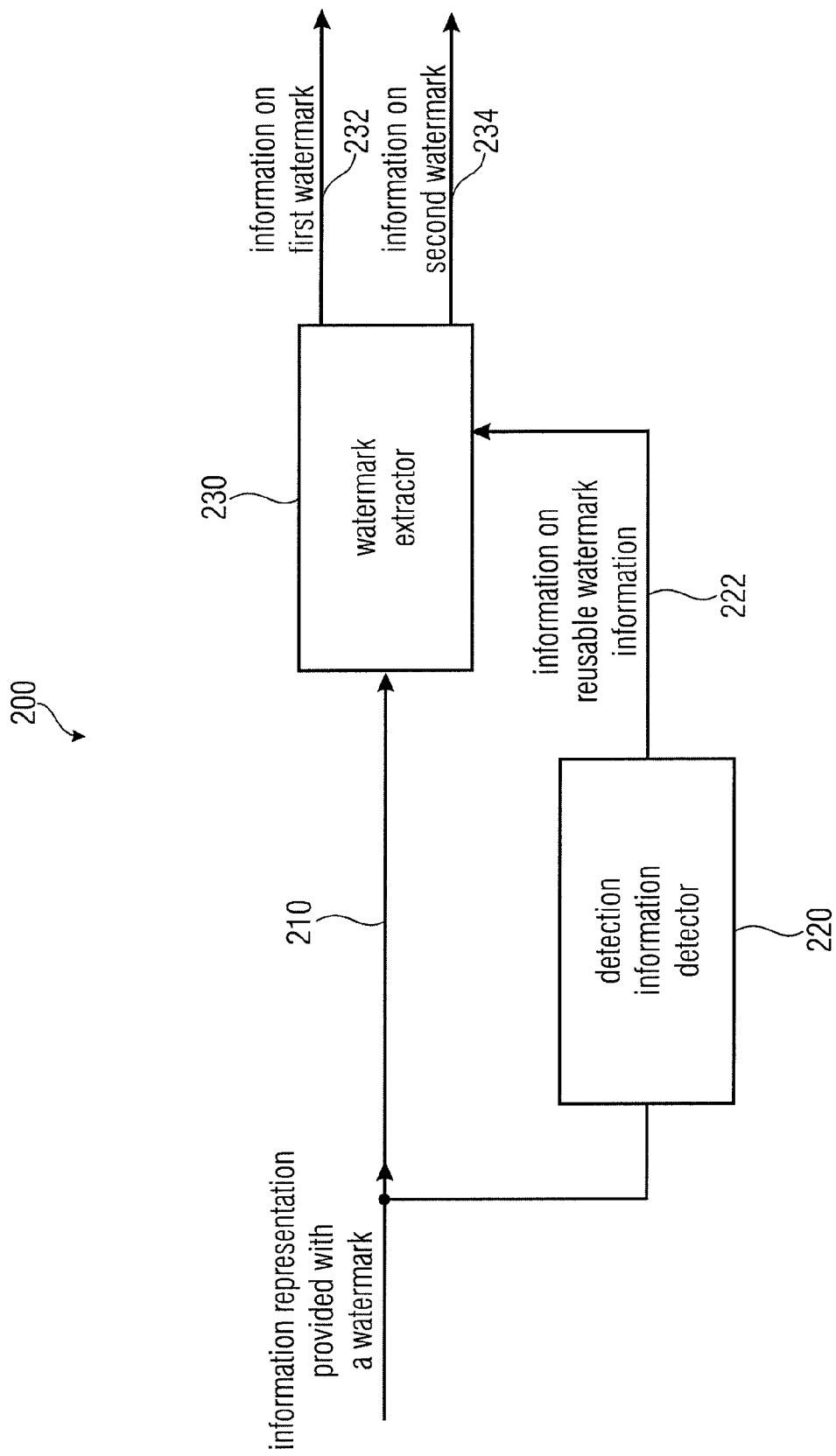
FIG. 2 shows a block diagram of a watermark detector according to an embodiment of the invention.

FIG. 2 shows a block diagram of a detector for detecting at least two watermarks in an information representation provided with one watermark. The detector according to FIG. 2 is designated by 200 in its entirety. The detector 200 is implemented to receive an information representation 210 provided with a watermark. The detector 200 further includes a detection information detector 220 which is implemented to identify reusable watermark information in the information representation 210 provided with the watermark. The detection information detector 220 is thus, for example, implemented to receive the information representation 210 and to provide information 222 about reusable watermark information. The detector 200 further includes a watermark extractor 230 which is implemented to extract a first watermark using the reusable watermark information from the information representation 210 and to extract a second watermark using the reusable watermark information from the input information representation 210. The watermark extractor 230 is, for example, implemented to receive the information representation 210 and the information 222 provided by the detection information detector 220 and, based thereon, to provide information 232 about a first watermark and information 234 about a second watermark.

Regarding the functioning of the detector 200, it is to be noted that the watermark extractor 230 is, for example, implemented to use information common to both watermarks for the detection of the first watermark described by the information 232 and for the detection of the second watermark described by the information 234. For example, the common reusable information may be synchronization information which is for both watermarks. Thus, it is sufficient in this case, for example, to detect the synchronization information only once, whereupon the detection of the at least two watermarks may be executed based on the common synchronization information.

The common, reusable information may, for example, additionally or alternatively be information which indicates that the first watermark and the second watermark may be detected with at least one common detection parameter. For example, the information representation 210 may contain information which indicates that at least two watermarks were embedded into the information representation 210 according to a common embedding method, so that the watermark extractor 230 may assume that at least two watermarks may be extracted with a corresponding common extraction method from the information representation 210.

Further, for example, the information representation 210 may carry information about how many watermarks are embedded in the information representation 210. The corresponding number information may, for example, be regarded as common information which commonly describes the at least two watermarks contained in the information representation 210. The number information may, for example, be extracted by the detection information detector 220 and may further be used, for example, to set one or several extraction parameters for the watermark extractor 230 to correctly extract several watermarks from the information representation 210. In other words, the number information may be used to correctly set detection parameters of the watermark extractor 230 for the extraction of two different watermarks.

If it is know, for example, that three watermarks are contained in the information representation 210, then, for example, in the extraction of the first watermark and in the extraction of the second watermark such detection parameters which are provided for embedding a fourth to $n^{th}$ watermark may be left out of consideration. Rather, it is sufficient to limit the range of detection parameters to be considered according to the number of watermarks present.

Further details are again described in the following, for example with reference to FIGS. 7a-7d.

Figure 3A:
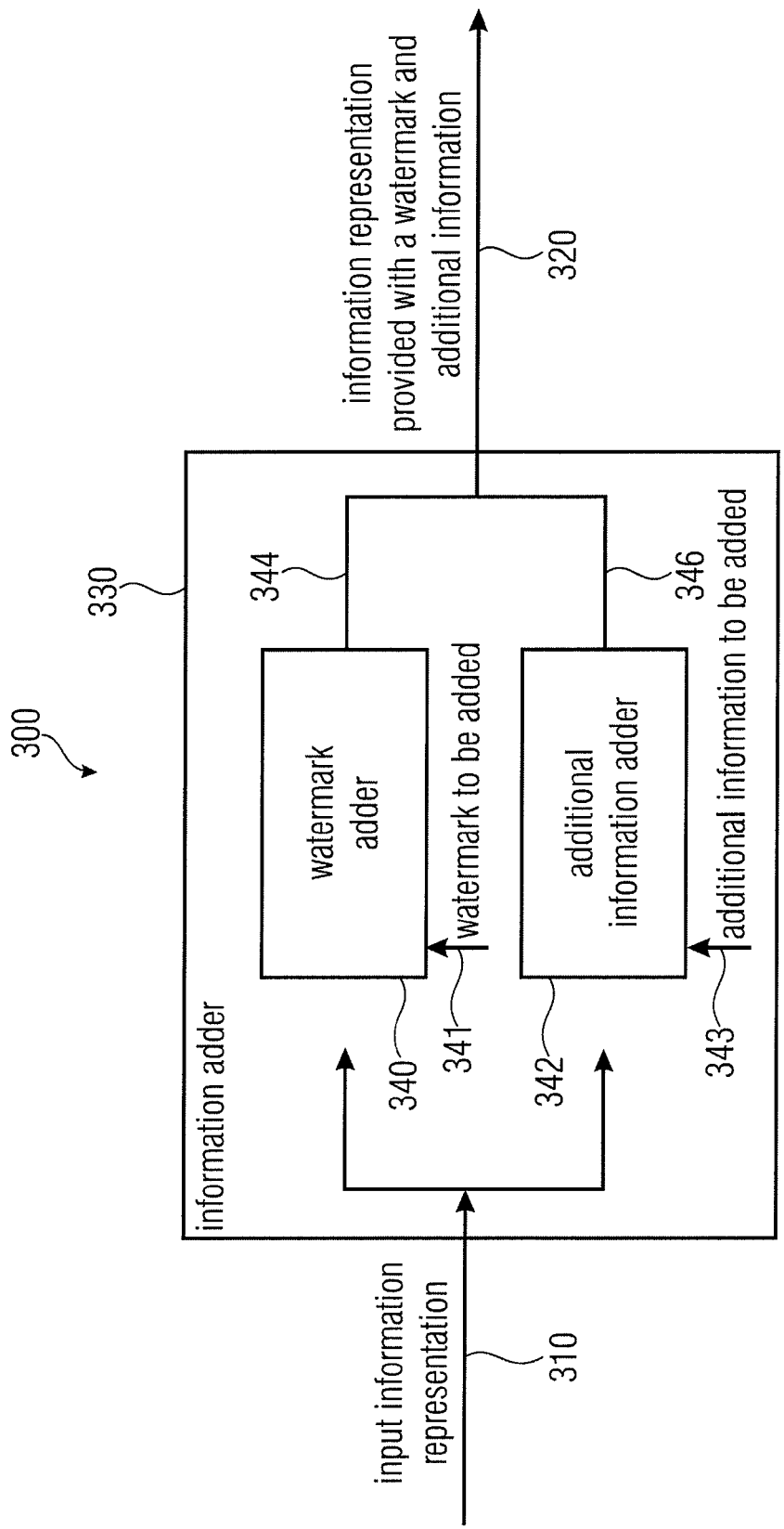
FIG. 3a shows a block diagram of a watermark embedder according to an embodiment of the invention.

FIG. 3a shows a block diagram of an embedder for embedding a watermark to be embedded into an input information representation according to an embodiment of the invention. The embedder according to FIG. 3a is designated by 300 in its entirety. The embedder 300 is implemented to receive an input information representation 310 and to provide an information representation 320 provided with a watermark and additional information. The embedder 300 includes an information adder 330 which is implemented to receive the input information representation 310 and to provide the information representation 320 provided with the watermark and the additional information. The information adder 330 is all in all implemented to provide the information representation 310 with the watermark 341 to be added and additional information 343 to be added to obtain the information representation 320 provided with the watermark and the additional information. The additional information to be added includes descriptive information regarding an embedding of at least one watermark into the information representation. For example, the descriptive information describes embedding at least one watermark into the information representation.

FIG. 3a shows an exemplary topology of the information adder 330. The information adder 330 may, for example, in a parallel structure, comprise a watermark adder 340 and an additional information adder 342. For example, both the watermark adder 360 and also the additional information adder 342 may receive the input information representation 310 to add the watermark to be added or the additional information to be added. For example, the watermark adder 340 may be implemented to receive the input information representation 310 and the watermark 341 to be added or to be embedded and, based thereupon, to generate an information representation 344 provided with the watermark to be added. The additional information adder 342 may, for example, be configured to receive the input information representation 310 and the additional information to be added 343 and, based thereupon, to generate an information representation 346 provided with the additional information. The information representation 344 provided with the watermark may further, for example, be combined with the information representation 346 provided with the additional information to obtain the information representation 320 provided with the watermark and additional information, as is indicated in FIG. 3a. Alternatively, it is also possible, however, that the watermark adder 340 provides as an output signal watermark information adapted to the information representation 310, that the additional information adder 342 provides additional information adapted to the information representation 310 and that the output signals of the watermark adder 340 and the additional information adder 342 are subsequently combined with the input information representation 310 to obtain the information representation 320 provided a watermark and additional information.

Figure 3B:
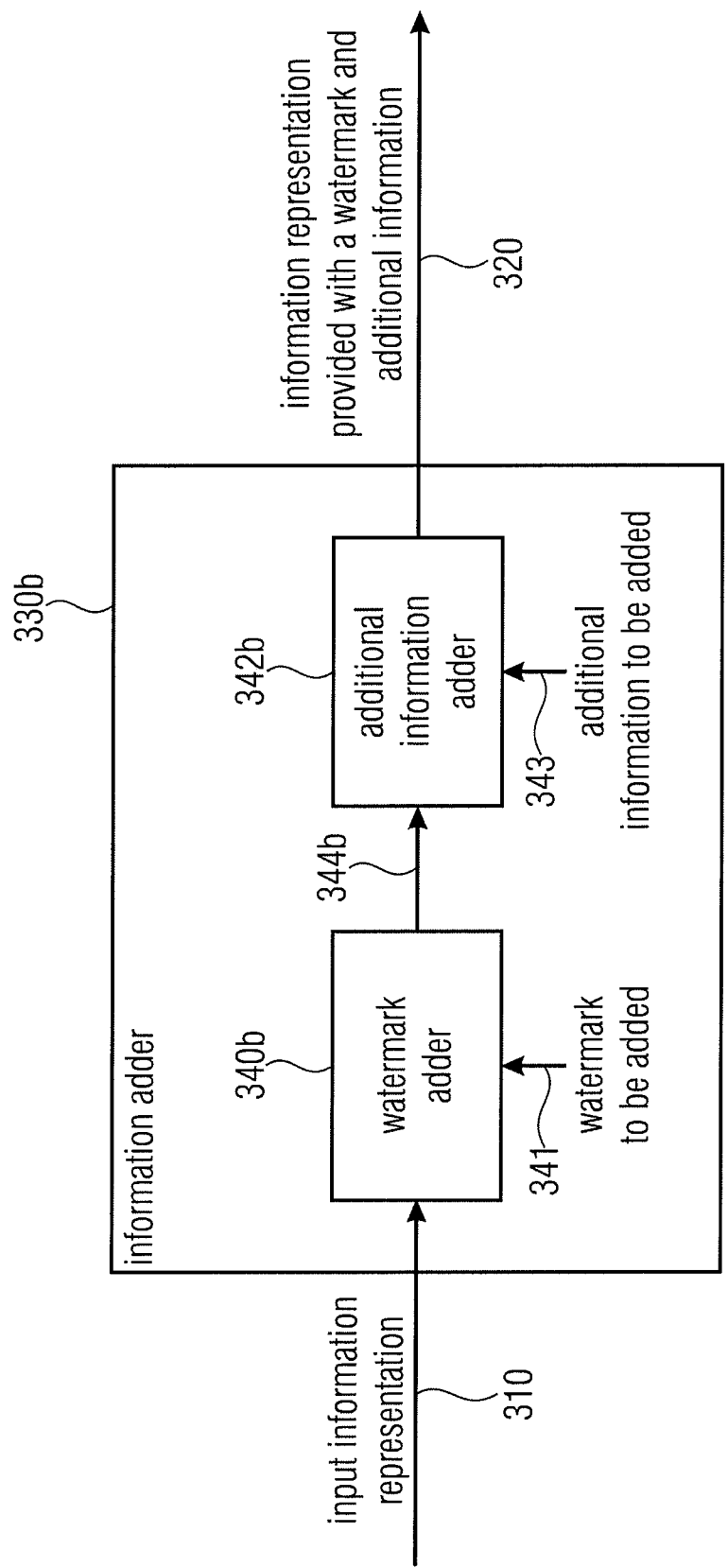
FIG. 3b shows a block diagram of a watermark embedder according to an embodiment of the present invention.

Alternatively, the information adder 330 may also comprise other structures, as are described, for example, in FIGS. 3b and 3c. For example, the information adder of the embedder 300 may be replaced by an information adder 330b according to FIG. 3b. The information adder 330b includes, for example, a series arrangement of a watermark adder 340b and an additional information adder 342b. The watermark adder 340b is configured, for example, to receive the input information representation 310 and to provide the input information representation 344b provided with a watermark to the additional information adder 342b. The additional information adder 342b may be configured, for example, to add the additional information to be added to the information representation 344b provided with the watermark and to thus provide the information representation 320 provided with the watermark and additional information.

As it may be gathered from FIG. 3c, the order of the additional information adder and the watermark adder may, of course, also be changed with respect to the order illustrated with reference to FIG. 3b. In this case, an additional information adder 342c is, for example, arranged in front of a watermark adder 340c.

In summary, it is to be noted that different structures may be used to add both the watermark to be added and also the additional information to be added to the input information representation 310. Adding these two pieces of information may, apart from that, also be done by a common information adder in which the blocks "watermark adder" and "additional information adder" are combined or summarized. In other words, no separate adder is necessitated for the watermark and the additional information.

However, the additional information to be added may well depend on embedding parameters of the watermark adder. Thus, for example, the additional information may encode how the watermark adder is configured or parametrized to add the watermark to be added. For example, the additional information may contain information on which watermark method the watermark adder used for adding the watermark to be added. Further, the additional information may also describe individual parameters which the watermark adder uses when providing the input information representation 310 with the watermark to be added. Thus, the additional information may, for example, carry information about which embedding code the watermark adder 340 is using, which frequency resources (e.g. frequency bands) the watermark adder 340 is using for embedding the watermark, or which time resources (e.g. time slots) the watermark adder is using for embedding the watermark. Further, the watermark adder 340 and the additional information adder 342 may, for example, also use different embedding methods when it is, for example, requested according to a specification that the additional information is to be embedded according to a predetermined embedding method, independent of which embedding method the watermark adder 340 is using. In this case, the watermark adder 340 and the additional information adder 342 are, for example, implemented such that no substantial mutual interference results when adding the watermark and when adding the additional information.

Further details regarding the embedding of a watermark and additional information are explained in more detail in the following, for example with reference to FIGS. 7a-7d.

Figure 4:
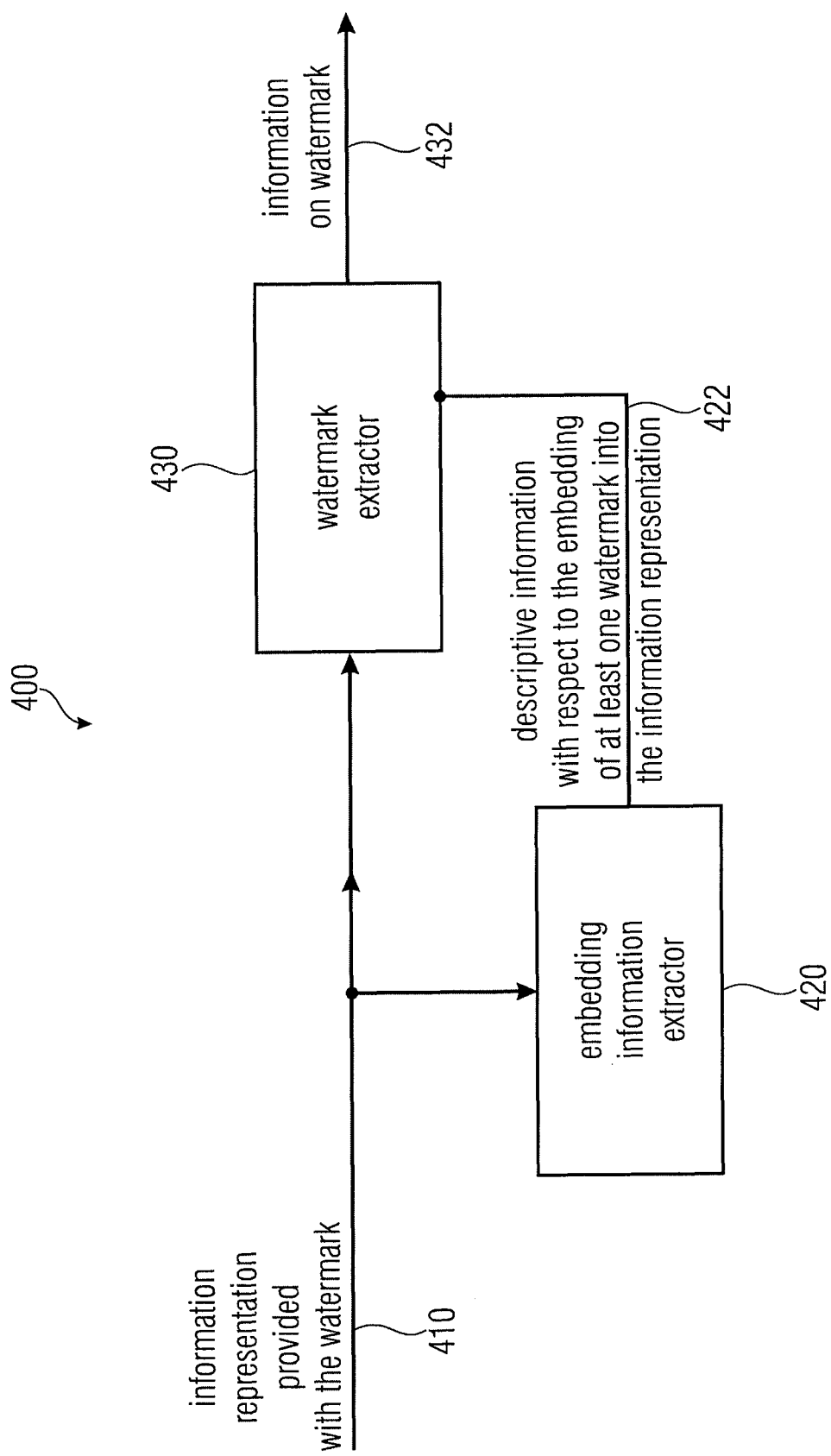
FIG. 4 shows a block diagram of a watermark detector according to an embodiment of the invention.

FIG. 4 shows a block diagram of a detector for detecting at least one watermark in an input information representation provided with a watermark. The detector according to FIG. 4 is designated by 400 in its entirety. The detector 400 is implemented to receive an information representation (or input information representation) provided with a watermark. The detector 400 includes an embedding information extractor 420 which is implemented to receive the information representation 410 provided with the watermark and to extract embedding information 422, including descriptive information regarding the embedding of at least one watermark into the information representation, from the information representation 410.

The detector 400 further includes a watermark extractor 430 which is implemented to receive the information representation 410 provided with the watermark and the descriptive information 422 with respect to the embedding of at least one watermark into the information representation 410. The watermark extractor 430 is further implemented to extract one or several watermarks contained in the information representation 410 depending on the embedding information 422 and to thus provide information 432 about at least one watermark.

The watermark extractor 430 may thus pointedly identify a watermark in the information representation 410 based on the embedding information 422. Based on the descriptive information 422, the watermark extractor 430 has, for example, information 422 regarding the fact using which embedding method a watermark present in the information representation 410 is embedded into the information representation. Alternatively or additionally, information 422 may, for example, be provided to the watermark extractor 430 from the embedding information extractor 420 about the fact which detection code or extraction code is to be used for the extraction of a watermark from the information representation 410. Further, the embedding information extractor 420 may, for example, provide information to the watermark extractor 430 about how many watermarks are contained in the information representation 410.

The embedding information extractor 420 may, for providing the descriptive information 422, evaluate, for example, additional information contained in the information representation. Additional information may, for example, be information not belonging to the actual information content of the watermark but describing in which way one or several watermarks are embedded in the information representation 410.

Figure 5:
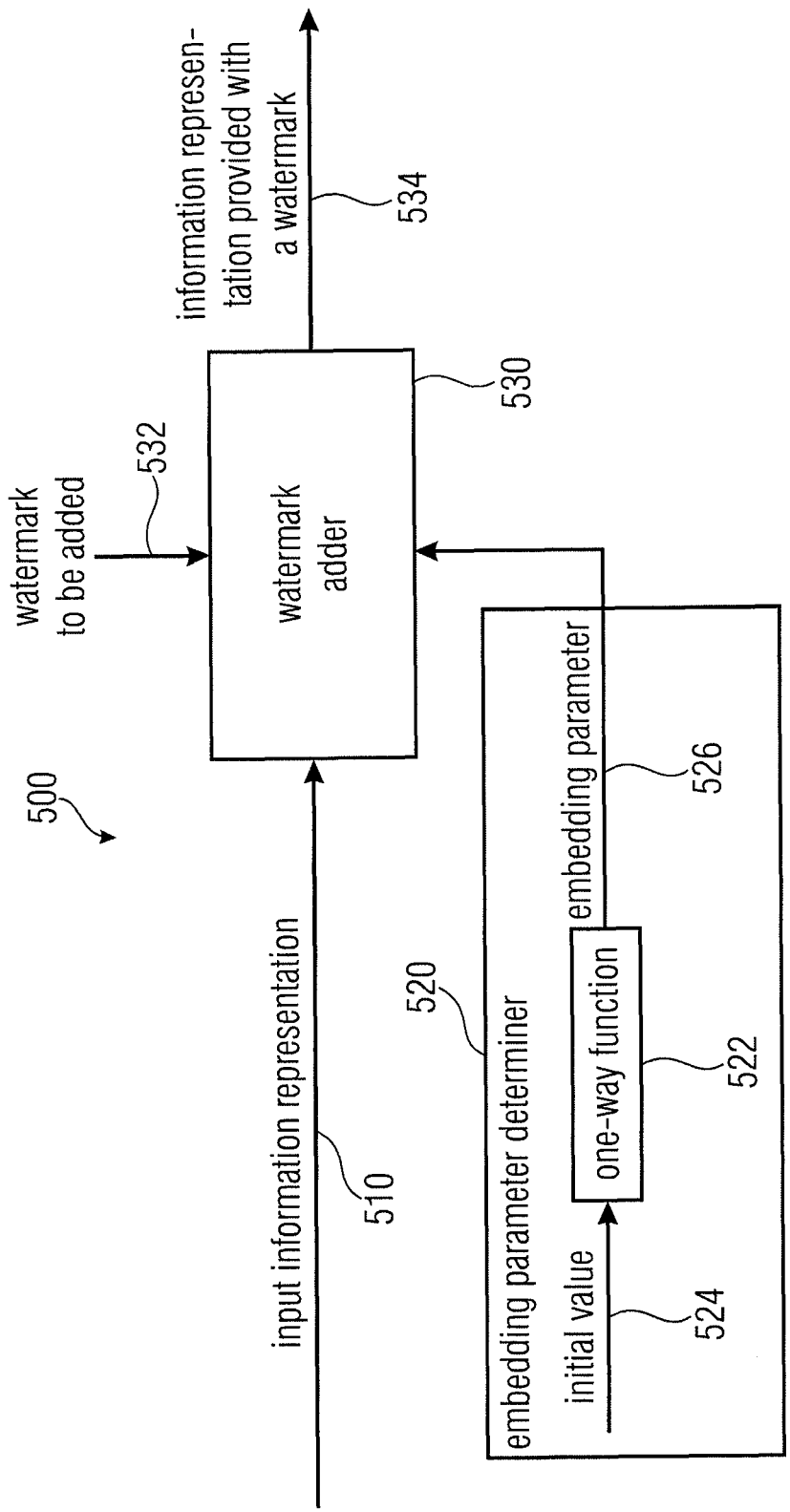
FIG. 5 shows a block diagram of a watermark embedder according to an embodiment of the invention.

FIG. 5 shows a block diagram of an embedder for embedding a watermark into an information representation or into an input information representation according to an embodiment of the invention. The embedder according to FIG. 5 is designated by 500 in its entirety. The embedder 500 is implemented to receive an input information representation 510 and to generate an information representation 534 provided with a watermark to be embedded or to be added. The embedder 500 includes an embedding parameter determiner 520. The embedding parameter determiner is implemented to apply a schematically indicated derivation function 522 one or several times to an initial value 524 to obtain an embedding parameter 526 for embedding the watermark to be embedded into the information representation. The embedder 500 further includes a watermark adder 530 which is implemented to receive the input information representation 510 and the embedding parameter 526. Further, the watermark adder 530 may be implemented to receive the watermark 532 to be added or to be embedded. The watermark to be added or to be embedded may further also be firmly stored in the watermark adder 530.

Thus, the watermark adder 530 provides, for example by embedding the watermark 532 to be added into the input information representation 510 using the embedding parameters 526, an information representation 534 provided with the watermark to be embedded.

The embedder 500 thus enables the determination of the embedding parameters 526 based on an initial value 524, wherein a derivation function 522 is evaluated. By the possibility of evaluating the derivation function 522 several times, there is the possibility, based on one single initial value 524, of generating different sets of embedding parameters 526 in a simple way. By the use of a derivation function, which may, for example, be a cryptographic one-way function, it may be achieved that access rights are allocated to different embedders. Details in this respect are given in the following.

Figure 6:
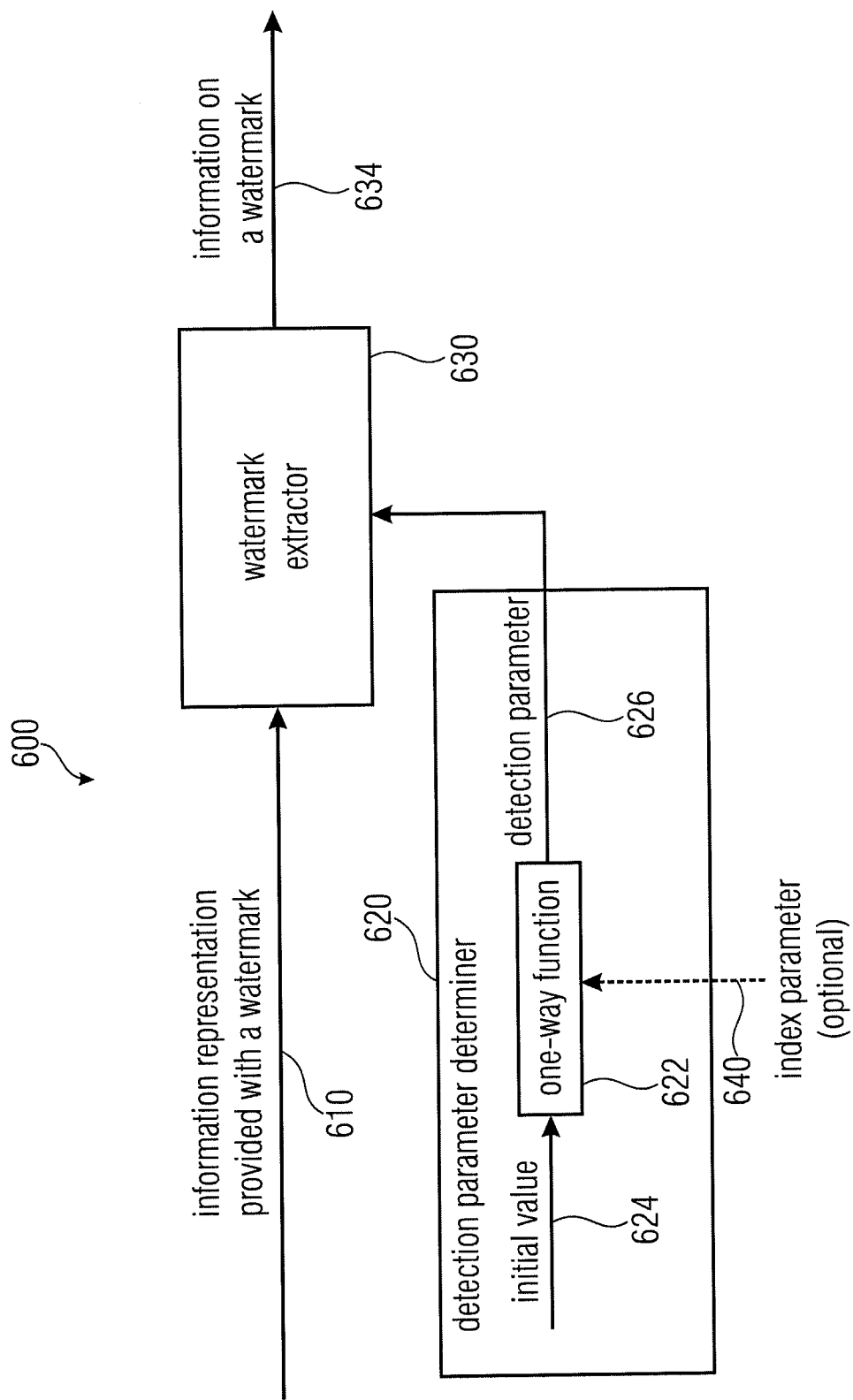
FIG. 6 shows a block diagram of a watermark detector according to an embodiment of the invention.

FIG. 6 shows a block diagram of a detector for detecting a watermark in an information representation provided with a watermark. The detector according to FIG. 6 is designated by 600 in its entirety. The detector 600 is implemented to receive an information representation or an input information representation 610 provided with a watermark and to provide information 634 about a watermark contained in the information representation 610.

The detector 600 includes a detection parameter determiner 620. The detection parameter determiner 620 is implemented to apply a schematically illustrated derivation function 622, one or several times, to an initial value 624 which may be given externally or which may be stored in the detection parameter determiner 620, and thus obtain a detection parameter 626 for the detection of the watermark in the information representation.

The detector 600 further includes a watermark extractor 630 which is implemented to receive the information representation 610 provided with the watermark and the detection parameter 626. The watermark extractor 630 is further configured to extract the information 634 about a watermark contained in the information representation 610 from the information representation 610 provided with the watermark using the detection parameter 626. In other words, the detection parameter 626 serves for setting the watermark extractor 630. The detection parameter may here, for example, indicate which resources (e.g. which time slots or frequency bands) are applied in the detection of the watermark. Alternatively or additionally, the detection parameter 626 may, for example, be used to determine a detection code, if, for example, in the information representation 610 different watermarks with different codes are separate from each other.

Further, the detection parameter determiner 620 may, for example, be implemented to decide, for example, based on an (optional) index parameter 640, how often the derivation function 622 is to be applied to the initial value 624 to obtain the detection parameter 626.

Apart from that, it is to be noted that, when determining the detection parameter 626 from the initial value 624, also additional algorithms may be used, for example. Thus, for example, an intermediate result obtained by the application of the derivation function to the initial value may serve as an input value for a calculation regulation which maps the intermediate result to a detection code. By the application of the corresponding function regulation it may, for example, be achieved that the thus obtained detection parameter comprises certain characteristics which are advantageous, or necessitated, for a watermark extraction. For example, the intermediate value, obtained by an application, once or several times, of the derivation function 622 to the initial value 624, may serve as an initial value (seed) for a spread code generator which determines different spread codes based on different seeds, wherein the spread codes are, for example, at least approximately orthogonal to each other. The corresponding spread codes may serve, for example, as detection parameters 626.

However, many other possibilities are possible for mapping the intermediate result, obtained by the application of the derivation function to the initial value, to a detection parameter 626.

Figure 7A:
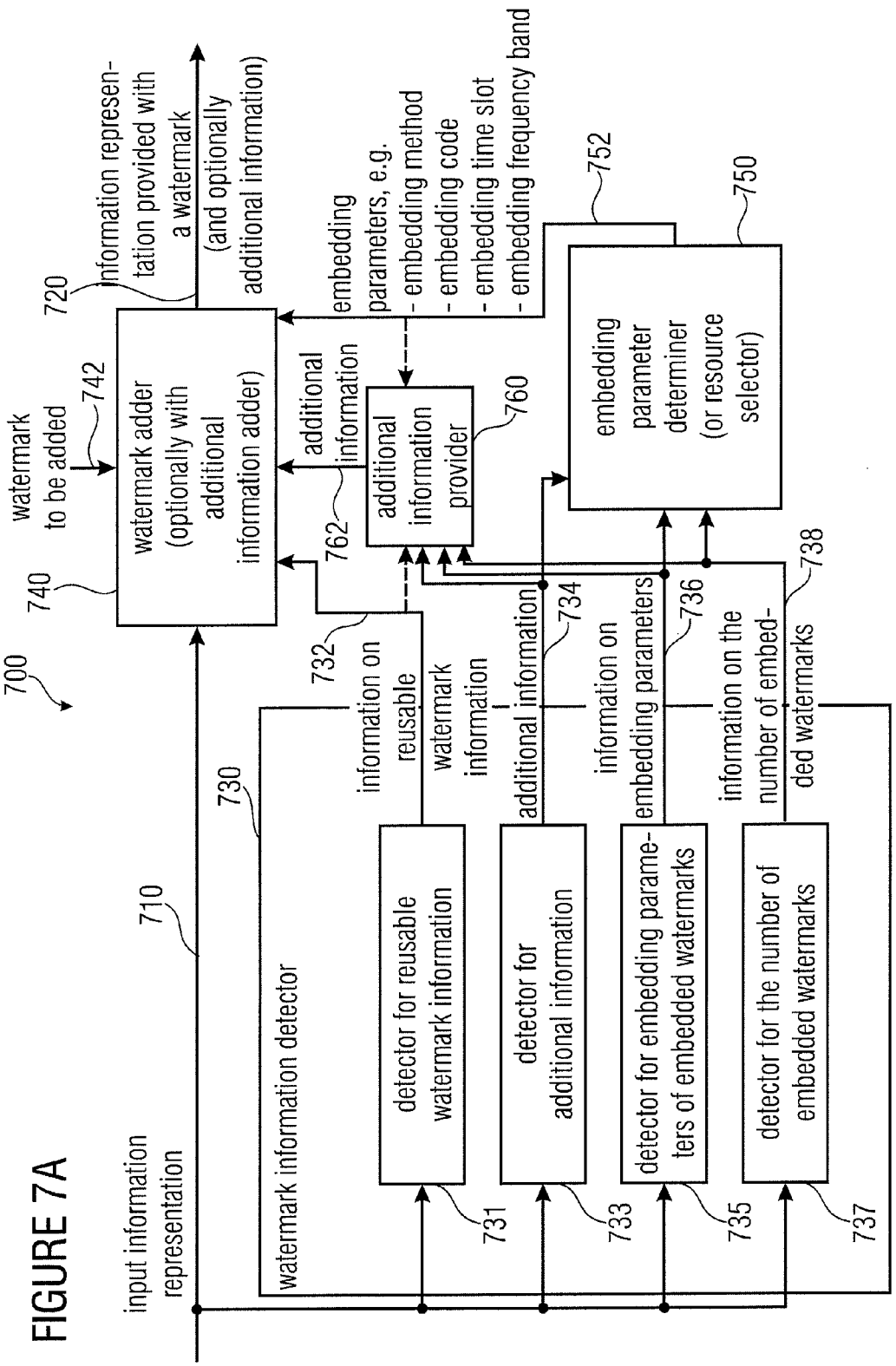
FIG. 7a shows a block diagram of a watermark embedder having a watermark information detector and an embedding parameter determiner according to an embodiment of the present invention.

FIG. 7a shows a block diagram of an embedder for embedding the watermark to be added into an information representation or into an input information representation. The embedder according to FIG. 7a is designated by 700 in its entirety. The embedder 700 is implemented to receive an input information representation 710 and to generate, based thereon, an information representation 720 provided with a watermark. The information representation 720 provided with the watermark may further be optionally provided with additional information, for example describing the embedding.

The embedder 700 includes a watermark information detector 730 which is implemented to receive the input information representation 710 and to obtain information regarding the embedding of a watermark therefrom. The embedder 700 further includes a watermark adder 740 which is implemented, for example using information provided by the watermark information detector 730, to add a watermark to be added to the input information representation 710 to obtain the information representation 720 provided with the watermark. The embedder 700 further includes, for example, an embedding parameter determiner 750 which is implemented to receive information from the watermark information detector 730 and to thus provide one or several embedding parameters to the watermark adder 740 so that, for example, the watermark adder 740 may be set depending on the setting parameters provided by the embedding parameter determiner 750.

The embedder 700 further includes an additional information provider 760 which is implemented to receive, from the watermark information detector, information regarding a watermark contained in the input information representation 710 and to provide additional information to the watermark adder 740 which may, for example, be added by the watermark adder 740 to the input information representation 710, so that the information representation 720 provided with the watermark further includes the additional information.

In the following, details are described regarding which information may be obtained by the watermark information detector 730 from the input information representation 710, and how this information may be used by the watermark adder 740, the embedding parameter determiner 750 and the additional information provider 760.

The watermark information detector 730 may, for example, include a detector 731 for the detection of reusable watermark information. The detector 731 for reusable watermark information may, for example, be implemented to detect synchronization information in the input information representation 710. The synchronization information may, for example, exist when a watermark is already present in the input information representation 710. The synchronization information may, for example, be a certain pattern contained in the input information representation 710 which may, for example, precede a watermark embedded into the input information representation 710 or which may, for example, be interleaved with a watermark embedded into the input information representation 710. The synchronization information may, for example, be a firmly given pattern which may be contained in the input information representation 710 encoded according to a certain encoding. For example, the synchronization information may be embedded into the input information representation 710 according to a predetermined synchronization embedding code. For example, the synchronization information may occur simultaneously (or at least overlapping in time) in several individual frequency bands in the information representation, whereby the synchronization information is, for example, especially well detectable. The detector 731 for the reusable watermark information may thus, for example, provide information 732 about the reusable watermark information to the watermark adder 740. The watermark adder 740 may, for example, be implemented, in response to the presence of reusable watermark information in the input information representation, to prevent a renewed embedding of the reusable watermark information. For example, the watermark adder 740 may be configured to only add synchronization information to the input information representation 710 when the information 732 of the detector 731 for the reusable watermark information indicates that in the input information representation 710 no watermark information is yet present or detectable.

If the information 732 of the determiner 731 for reusable watermark information indicates, for example, that in the input information representation 710 synchronization information is already present, then the watermark adder 740 may, for example, add the watermark to be added synchronized with the already existing synchronization information in the input information representation. For this purpose, the detector 731 may, for example, provide information for the reusable watermark information to the watermark adder 740 with regard to where in the input information representation (for example at what time or in which frequency bands) synchronization information already exists. Based thereon, the watermark adder 740 may, for example, calculate or determine where (for example in which time interval or in which frequency bands) the watermark to be added is to be added to the input information representation 710.

Further, the watermark adder 740 may be configured to add synchronization information to the input information representation 710 when the information 732 of the detector 731 for reusable watermark information indicates that, in the input information representation 710, no reusable synchronization information was detected.

By the repeated use of the synchronization information when embedding a further watermark by the watermark adder 740 into an input information representation, in which synchronization information (and thus in many cases also watermark information) already exists, on the one hand a negative influencing of the information representation 710 by embedding the watermark to be embedded may be minimized and, on the other hand, a resource-saving detection of several watermarks may be enabled in the information representation 720 provided with a watermark. Thus, conventionally, the influence on an information representation is less, the less information is embedded into the same. If thus synchronization information already existing in the information representation 720 is reused instead of embedding new additional synchronization information, an influence on the information content of the information representation may be minimized. On the side of a watermark detection it is, apart from that, sufficient in the reuse of the synchronization information to detect the synchronization information once. Thus, the detection effort may be kept low as compared to when two different pieces of synchronization information would have to be detected.

The watermark information detector may further comprise, for example, a detector 733 for detecting additional information contained in the input information representation 710. The detector 733 may, for example, provide information 734 about the additional information. The additional information may, for example, be page information describing the embedding of one or several watermarks into the input information representation 710. For example, the additional information may carry information about how many watermarks are already embedded in the input information representation 710. The additional information here does not necessarily have to describe the overall number of embedded watermarks, but may be restricted to indicating how many watermarks were embedded according to a certain watermark embedding method into the input information representation. The information about the number of the existing watermarks may further be restricted to indicate how many watermarks were embedded by a certain watermark embedder into the input information representation. In an ideal case which may, however, not be achieved, the information about the number of existing watermarks may also carry information about an overall number of watermarks. In some embodiments, thus the information about the number of existing watermarks at least provides information about a minimum number of existing watermarks, wherein more watermarks may in fact exist.

The detector 733 may further be implemented, for example, to detect additional information which indicates according to which watermark embedding method or according to which watermark embedding methods the watermarks existing in the input information representation 710 are embedded. This information may, for example, exist in connection with the synchronization information in the input information representation 710. For example, the synchronization information may contain information, for example by the selection of the synchronization pattern, according to which watermark embedding method the watermark information contained in the information representation 710 is embedded. Alternatively or additionally, also subsequent to the synchronization information or parallel to the synchronization information, corresponding additional information may exist in the input information representation 710 which indicates according to which watermark embedding method one or several watermarks are embedded in the input information representation 710.

Alternatively or additionally, the additional information may, for example carry information about what resources (e.g. time slots, frequency bands or embedding codes or spread codes) were used for embedding one or several watermarks into the input information representation. This information may be contained in additional information which may, for example, comprise the above-described structure. In other words, corresponding additional information may, for example, be contained within the synchronization information, parallel in time to the synchronization information or subsequent to the synchronization information (for example directly subsequent to the synchronization information) in the input information representation. In some embodiments, the additional information is encoded separately to the associated watermark information described by the additional information. While the watermark information thus, for example, encodes a certain useful information which is, for example, freely selectable on the embedder side, the additional information may, for example, be determined on the basis of the fact by which parameters the actual useful information of the watermark is encoded or embedded. In other words, in some embodiments a strict logical separation between the additional information directed to the type of representation of the useful information in the watermark, and the actual useful information itself which is encoded by the watermark may exist. In other words, using the additional information, for example embedding parameters, using which the useful information to be encoded by the water was embedded into the information representation, are identified without having to decode the useful information of the watermark. In other words, the additional information is in some embodiments independent of the useful information encoded by the watermark and only depends on parameters according to which an embedder is operated.

In some embodiments, the watermark information detector 730 includes a detector 735 for embedding parameters of embedded watermarks. The detector 735 may, for example, receive the input information representation 710 and thereupon provide information 736 on embedding parameters, using which one or several watermarks are embedded into the input information representation 710. The detector 735 may, for example, be implemented to analyze the input information representation 710 in order to find out, using which settings or parameters watermarks were embedded into the input information representation 710. For this purpose, the detector 735 may, for example, also analyze the watermarks themselves. For example, the detector may apply a pattern recognition method to the input information representation in order to determine whether watermarks were embedded into the input information representation 710 according to a certain embedding method. As a pattern-recognizing method, for example a correlation method may be used, according to which the input information representation 710 is correlated with one or several comparative values. Further, the detector may also apply other algorithms in order to obtain information 736 on an embedding parameter of at least one watermark already contained within the input information representation 710.

In other words, while the detector 733 may, for example, be implemented to evaluate additional information which is different from the useful information represented by the watermark, the detector 735 may, for example be implemented to analyze the watermark information represented by the useful information. Thus, different possibilities exist as to the way in which information may be obtained on a watermark contained in the input information representation 710. Apart from evaluating the additional information by the detector 733, also a direct analysis of the watermark information (or, in some embodiments, of the complete watermark information including the useful information) is available.

In one further embodiment, the watermark information detector 730 may (alternatively or additionally) include a detector 737 which is implemented to determine a number of watermarks embedded in the input information. The detector 737 may, for example, be implemented to receive the input information representation 710 and to provide information 738 about the number of embedded watermarks (or detected embedded watermarks).

As was already described above, it is not compulsory for the information 738 to describe all the watermarks contained in the input information representation. Rather, it is sufficient in some embodiments if the information 738 describes a number of watermarks detected in the input information representation.

In summary it is to be noted that there is a multitude of possibilities for obtaining information by the watermark information detector 730 which describes the embedding of watermarks in the input information representation 710. The corresponding information 732, 734, 736, 738 may be used in different ways, as is described in the following.

For example, the information 732 may directly be transferred to the watermark adder 740 via reusable watermark information, so that the same may decide, for example based on the information on reusable watermark information, whether reusable watermark information is contained in the input information representation 710. The possibly reusable information may then be directly used by the watermark adder 740.

Further, the additional information provider 760 may receive the information 732, 734, 736, 738 provided by the watermark information detector 730 (or maybe only one or several pieces of the mentioned information) and derive therefrom additional information to be added to the input information representation 710. The additional information may, for example, include information regarding the embedding of watermarks or watermark information already contained in the input information representation 710. For example, the additional information 762 may comprise a reference to the additional information 734 already contained in the input information representation 710 and detected by the detector 733. Further, the additional information 762 to be added may, for example, include a copy of the additional information 734 contained in the input information representation 710 and further be supplemented by other information related, for example, to the embedding of the watermark to be added. Further, the additional information 732 may, for example, describe a number of watermarks contained in the information representation 720 provided with the watermark to be added. If thus, by the watermark information detector 730, information about a number of watermarks embedded in the input information representation 710 is provided, then, for example, the additional information provider 760 may increment the mentioned number and thus generate the additional information 762 so that the same describes a number of watermarks contained after adding the watermark to be added in the information representation 720. Further, the additional information 762 may include information on embedding parameters of watermarks already contained in the input information representation 710 about embedding parameters, according to which the watermark to be added is embedded.

It is to be noted that the additional information 762 does, of course, not have to include all of the mentioned information, but that it is sufficient if the additional information only includes one or several of the mentioned pieces of information.

In some embodiments, however, advantages result when the additional information 762 not only describes how the watermark to be added is added to the input information representation 710, but when the additional information 762 further also includes information on watermarks already contained in the input information representation 710. This combined information describing both the watermarks already existing in the input information representation 710 and also the embedding of the watermark to be embedded may be evaluated in an especially efficient way by a detector. Thus, a detector may, for example, by evaluating one single additional information, obtain extensive information on the embedding of all watermarks contained in the input information representation 710 (or at least with respect to a plurality of watermarks contained in the input information representation). It is thus not necessitated to evaluate many individual pieces of additional information and to compile their information.

The embedding parameter determiner 750 may further be implemented to set or adapt embedding parameters for the embedding of the watermark to be added by the watermark adder 740 depending on one or several pieces of information 732, 734, 736, 738 provided by the watermark information detector 730. If, for example, the additional information 734 includes information on using which resources (e.g. using which time slots, using which frequency bands or using which embedding codes) the watermarks already contained in the input information representation 710 are embedded, then the embedding parameter determiner 750 may, for example, select suitable embedding parameters or embedding resources for embedding the watermark to be added. For example, the embedding parameter determiner 750 may be configured to select the resources for the embedding of the watermark to be added so that no unacceptable intersections whatsoever result between the resources used in the embedding of the watermark to be added and the resources used in the embedding of the already existing watermarks. Based on the information regarding which time slots are used by the watermarks already contained in the input information representation 710, the embedding parameter determiner 750 may, for example, select a free time slot for the embedding of the watermark to be added. In a similar way, the embedding parameter determiner 750 may select suitable (free or only relatively weakly occupied) frequency bands for the embedding of the watermark to be added, when the information provided by the watermark information detector 730 indicates the occupation of frequency bands.

If the information provided by the watermark information detector 730 indicates which embedding code or which embedding codes were used for embedding information into the input information representation 710, then the embedding parameter determiner 750 may, for example, further select an embedding code for embedding the watermark to be added which is, for example, different from the embedding codes used in the input information representation 710. For example, the embedding parameter determiner 750 may select an embedding code for the embedding of the watermark to be added, which is at least approximately orthogonal to embedding codes which were used for the embedding of watermarks already contained in the input information representation. Thus it may, for example be guaranteed by the evaluation of the input information representation 710 by the watermark information detector 730 that the watermark to be added is embedded using an embedding code which is different from the embedding codes of the already existing watermarks.

In one embodiment, the embedding parameter determiner may be implemented to also generate embedding parameters for an embedding of additional information as is, for example, provided by the additional information provider 760. In this case, the embedding parameter determiner 750 may, for example, be configured to set the embedding parameters for the embedding of the additional information 762 such that the additional information 762 is embedded substantially using the same embedding parameters as additional information already contained in the input information representation 710. For this purpose, for example the watermark information detector 730 may also provide information on embedding parameters, using which additional information already contained in the information representation 710 was embedded into the input information representation 710. In this way, it may, for example, be enabled that both the additional information already contained in the input information representation 710 and also the additional information 762 to be added may be detected efficiently by a detector.

In a further embodiment, the information 738 about the number of embedded watermarks may be evaluated to determine or specify the embedding parameters. For example, the embedding parameter determiner 750 may comprise a functionality, corresponding to a functionality of the embedding parameter determiner 520, as was explained with reference to FIG. 5. The information 738 about the number of embedded watermarks (which may, for example, be determined either based on additional information in the input information representation or based on an analysis of the input information representation) may, for example, be used to decide how often the derivation function 522 is applied to the initial value 524 in order to obtain the embedding parameter 526.

In summary it may thus be noted that, by the embedding parameter determiner 750, for example one or several embedding parameters 752 may be generated which may then be supplied to the watermark adder 740. The embedding parameters may here, for example, be selected based on information 732, 734, 736, 738 on watermarks already contained in the input information representation 710. The embedding parameters may, for example, serve for selecting an embedding method. Further, the embedding parameters may also describe details regarding the embedding, e.g. an embedding code, an embedding time slot or an embedding frequency band.

Figure 7B:
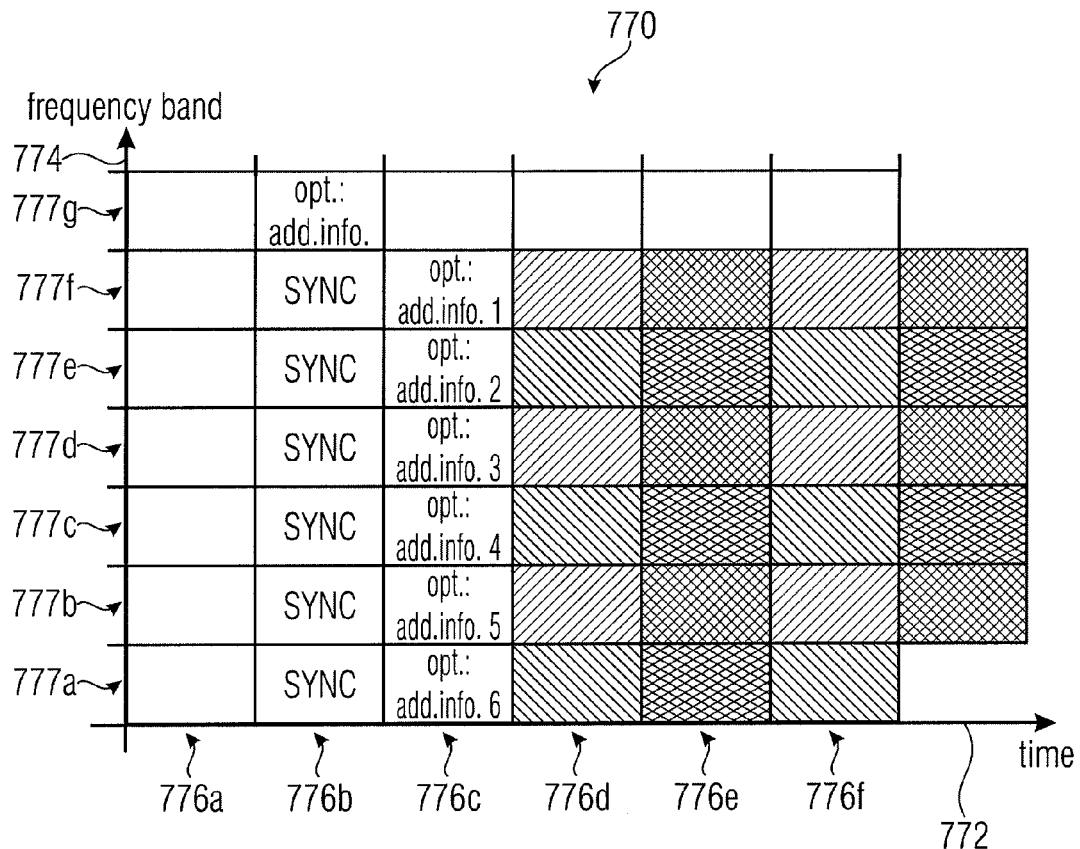
FIG. 7b shows a schematical illustration of an information signal having an embedded watermark according to an embodiment of the invention.
Figure 7B:
Figure 7B:
Figure 7B:
Figure 7B:
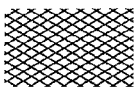

Further details regarding individual aspects of the embedder 700 are described in the following with reference to FIGS. 7b-7d. Thus, FIG. 7b shows a graphical representation of resources which are available for an embedding of watermark information. The graphical illustration of FIG. 7b is designated by 770 in its entirety. The graphical illustration 770 illustrates a time/frequency band representation of an information representation. At an abscissa 772, for example time is plotted, and at an ordinate 774, for example frequency is plotted. The time/frequency representation may, for example, represent an audio signal which may be divided into individual time sections and frequency bands. A corresponding representation of an audio signal may, for example, take place by a spectral analysis as may, for example, be achieved by a filter bank. Different time sections are, for example, designated by 776a-776f. Different frequency bands are, by the way, designated by 777a-777g.

In one time section 776b, for example in the frequency bands 777a-777f, basically synchronization information (SYNC) is contained. Further, for example in another frequency band 777g in the time section 776b (i.e. parallel in time to the synchronization information), additional information may be contained describing the embedding of a watermark. The additional information in the frequency band 777g during the time interval 776b may, of course, be regarded as optional. Further, additional information may also, for example, be contained in a time slot after the synchronization information (SYNC). For example, the synchronization information in the frequency bands 777a-777f may be contained during the time section 776c.

For example, the additional information for different embedded watermarks may be contained in different frequency bands (or time slots). For example, the additional information describing a first embedded watermark or inserted in a first watermark embedding, may be contained in the frequency band 777f during the time section 776c. Additional information relating to the embedding of a second watermark, or added in the embedding of a second watermark, may, for example, be inserted in the frequency band 776e during the time section 776c. In general, additional information describing the embedding of different watermarks, or those which are embedded in different embedding steps, may be added to the information representation using different resources (here: using different frequency bands). Thus, for example when adding a further watermark, the existing additional information is supplemented by adding further additional information, for example using hitherto unused resources. Thus, for example an overlapping of additional information is prevented, whereby it is, for example, achieved that the information representation is not unnecessarily strongly affected, and whereby it is further achieved that the individual additional information is readable without mutual interferences. In this respect it is to be noted that, in the embedding of watermark information in an information representation, it is generally difficult or even impossible to remove or change information (e.g. additional information) again once inserted into the information representation. For this reason, in some embodiments of the invention, when adding a watermark to be added, additional information is added to possibly already existing additional information.

The graphical illustration 770 further shows different resources used for the embedding of different watermarks. For example, useful information of the first watermark may be inserted into resource sections designated by a first hatching 778a. For example, the information of the first watermark in the first time section 776d may be contained in the frequency bands 777b, 777d and 777f. Further, the information of the first watermark during the fourth time section 776f may be contained in the frequency bands 777b, 777d and 777f. Information of a second watermark may, for example, be contained, or encoded, using the resources designated by a second hatching 778b (time section 776d: frequency bands 777a, 777c, 777e; time section 776f: frequency bands 777a, 777c, 777e). Useful information of the third watermark may, for example, be contained in resources designated by a third hatching 778c, and useful information of a fourth watermark may, for example, be contained in resources designated by a fourth hatching 778d.

From the graphical illustration 770 it may, for example, be gathered that the useful information of the watermarks (described by the fields of the graphical illustration 770 designated by hatchings 778a, 778b, 778c, 778d) saved separate from corresponding additional information in the watermark.

In summary it may be noted that the graphical illustration of FIG. 7b may describe an information signal, wherein, in addition to underlying useful information (for example including an audio signal, image information, text information or computer program information), a watermark and, for example, additional information is contained in the information signal. The information signal may be supplemented by all those features and aspects described within the scope of the present specification with regard to the embedders or detectors.

Figure 7C:
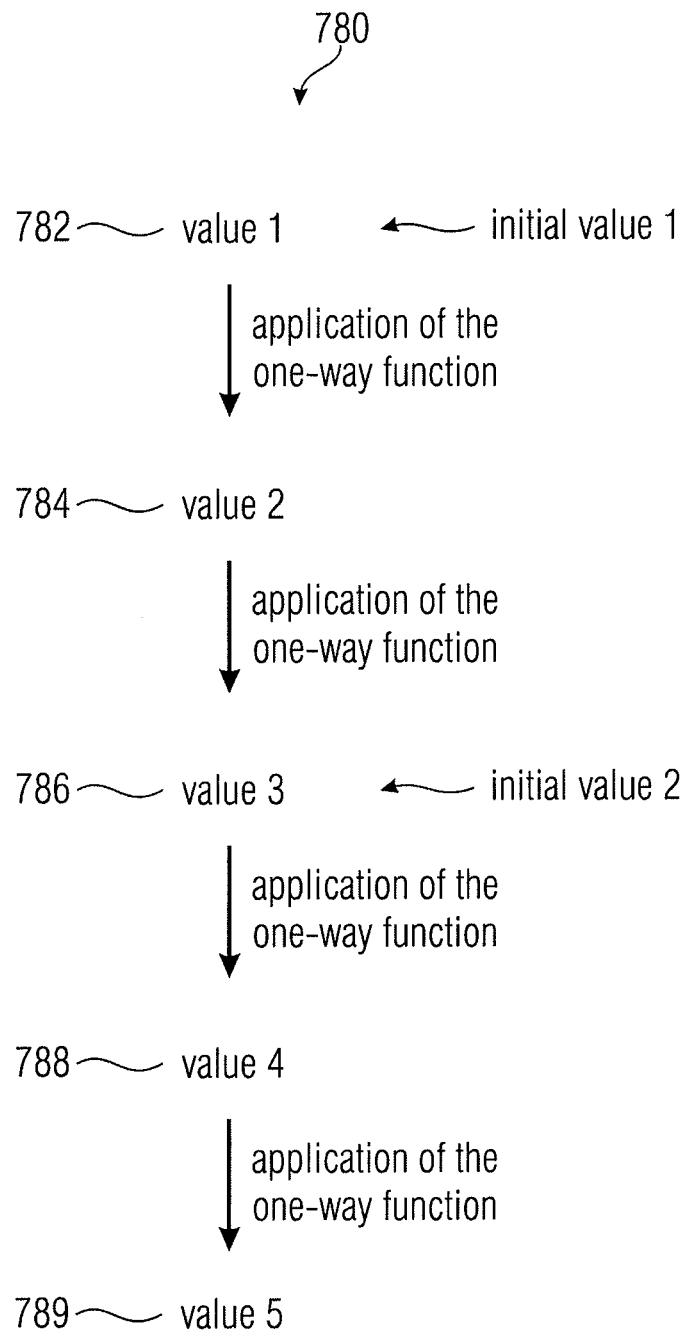
FIG. 7c shows a schematical illustration of a determination of a value sequence using a one-way function.
Figure 7D:
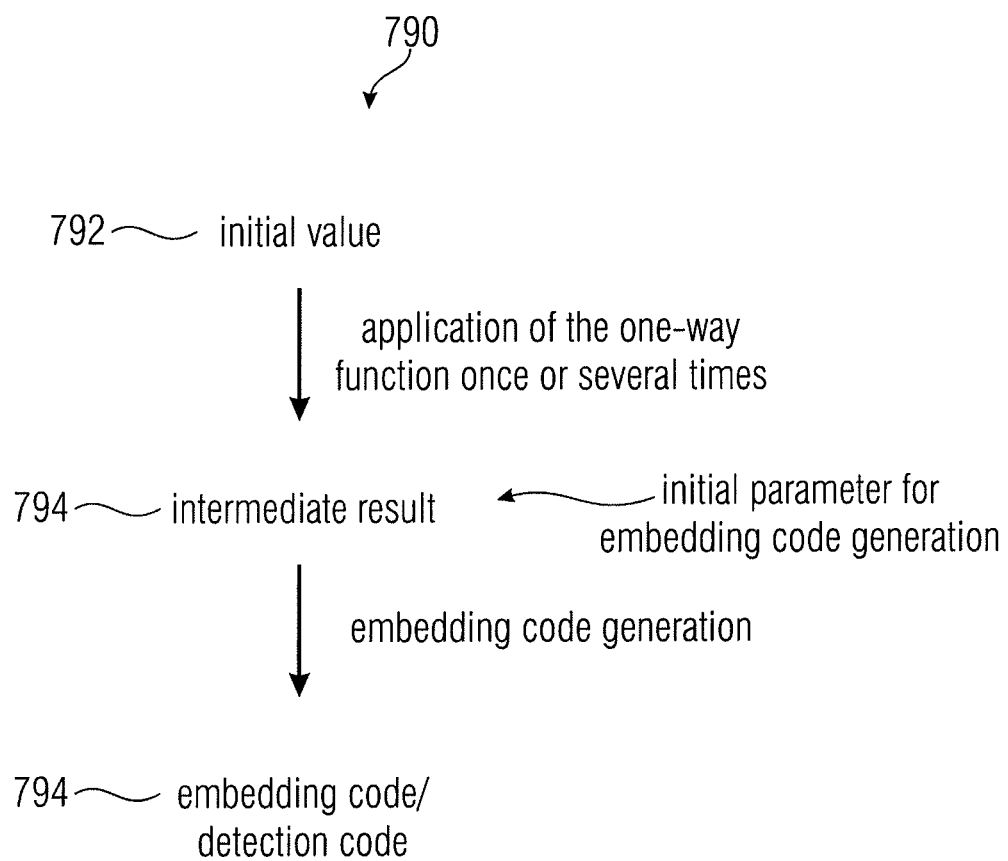
FIG. 7d shows a graphical illustration of a procedure of calculating an embedding code based on an initial value.

FIG. 7c shows a graphical illustration of a procedure in a determination of an embedding parameter using a one-way function. The graphical illustration according to FIG. 7c is designated by 780 in its entirety. In the following it is first of all assumed that a first value 782 is known to an embedder (or a detector), wherein the first value 782 may also be regarded as the first initial value, or "initial value 1". By applying the mentioned one-way function, a second value 784 may, for example, be obtained from the first value 782. Here, for example, an algorithm is known as to how the second value 784 may be obtained from the first value 782 with comparatively low computational effort. In some embodiments, however, it is not possible, or only possible with extreme effort, to calculate the first value 782 from the second value 784. For this reason, the one-way function is partially also referred to as a "cryptographic one-way function".

From the second value 784, however, by a further application of the one-way function, for example a third value 786 may be obtained. In other words, the same algorithm is applied to the second value 784 which was applied to the first value 782 for determining the second value 784, and thus, for example, from the second value 784 the third value 786 is obtained. By a further application of the one-way function to the third value 786, for example a fourth value 788 may be obtained. The one-way function is again applied to the fourth value 788, and thus, for example, a fifth value 789 is obtained. It thus remains to be noted that it is sufficient to know the first value 782 and the one-way function (or the algorithm described by the one-way function) to obtain the second to fifth values 784-789 from the first value 782 by a repeated application of the one-way function.

The values 782-789 may, apart from that, for example be used to serve as a description for embedding parameters or detection parameters of an embedder or detector, as was already explained above.

Further, an administration of different access rights may be implemented. If, for example, a first embedder (or detector) knows the first value 782 (initial value 1), it may, based thereon, using the one-way function, determine all the values 782-789 with low computational effort. If, however, an embedder (or detector) only knows the third value 786 (initial value 2), then the corresponding embedder (or detector) may only determine the fourth value 788 or the fifth value 789 (or subsequent values) using reasonable computational effort. The mentioned detector, which only knows the third value 786 (initial value 2) and the one-way function, but not the first value 782 or the second value 784, can thus not determine the first value 782 and the second value 784 using reasonable computational effort. Accordingly, the mentioned detector only knowing the initial value 2 cannot execute the embedding or detection of a watermark, so that the embedding parameters correspond to the embedding parameters belonging to the first value 782 or the second value 784. Thus, it may, for example, be guaranteed that an embedder which only knows the third value 786 (initial value 2) may not execute in an unauthorized way an embedding of a watermark according to the embedding parameters belonging to the first value 782 or according to the embedding parameters belonging to the second value 784.

In the following it is briefly described with reference to FIG. 7d how, using a one-way function, an embedding parameter may be obtained. For this purpose, FIG. 7d shows a graphical illustration of a procedure when determining an embedding code or a detection code from an initial value using a one-way function. The graphical illustration according to FIG. 7d is designated by 790 in its entirety. The graphical illustration 790 shows that, based on an initial value 792, an intermediate result 794 may be obtained by the application of a one-way function once or several times. The intermediate result 794, for example, corresponds to the second value 784, the third value 786, the fourth value 788 or the fifth value 789 according to FIG. 7c. The intermediate result 794 may, of course, also correspond to other values, which may, for example, be obtained by an application of the one-way function more than four times to the first value 782 or to the initial value 782. The intermediate result 794 may, for example, serve as a seed (starting parameter) for an embedding code generation. For example, based on the intermediate result 794, an embedding code may be generated by supplying the intermediate result as a seed to a code generator. As a code generator, here, for example, a feedback shift register arrangement may serve, as it may be known for the generation of pseudo-random numbers. Different initial values for the feedback shift register arrangement in some embodiments leads to different code sequences at an output of the feedback shift register arrangement, wherein the different code sequences may, for example, form the different embedding codes. In other words, for example a first code sequence is generated by a feedback shift register arrangement when the feedback shift register arrangement is provided or pulsed with the first initial value. Further, a second bit sequence or code sequence is generated when the feedback shift register arrangement is provided with a second initial value. The different bit sequences, for example, form the different code sequences.

For the determination of the embedding code or detection code 796 from the intermediate result 794, however, generally any algorithm may be used which enables obtaining different codes based on different seeds 794, wherein the codes, for example at least approximately, comprise default characteristics (e.g. stochastic characteristics). For deriving an embedding parameter from the intermediate result 794, also other algorithms may be applied. For example, individual bits of the intermediate result 794 may be directly used to directly form the embedding parameters. Further, different mappings (which may, for example, be defined by associated mapping tables or logic tables) are possible for determining an embedding parameter from the intermediate result 794.

Figure 8:
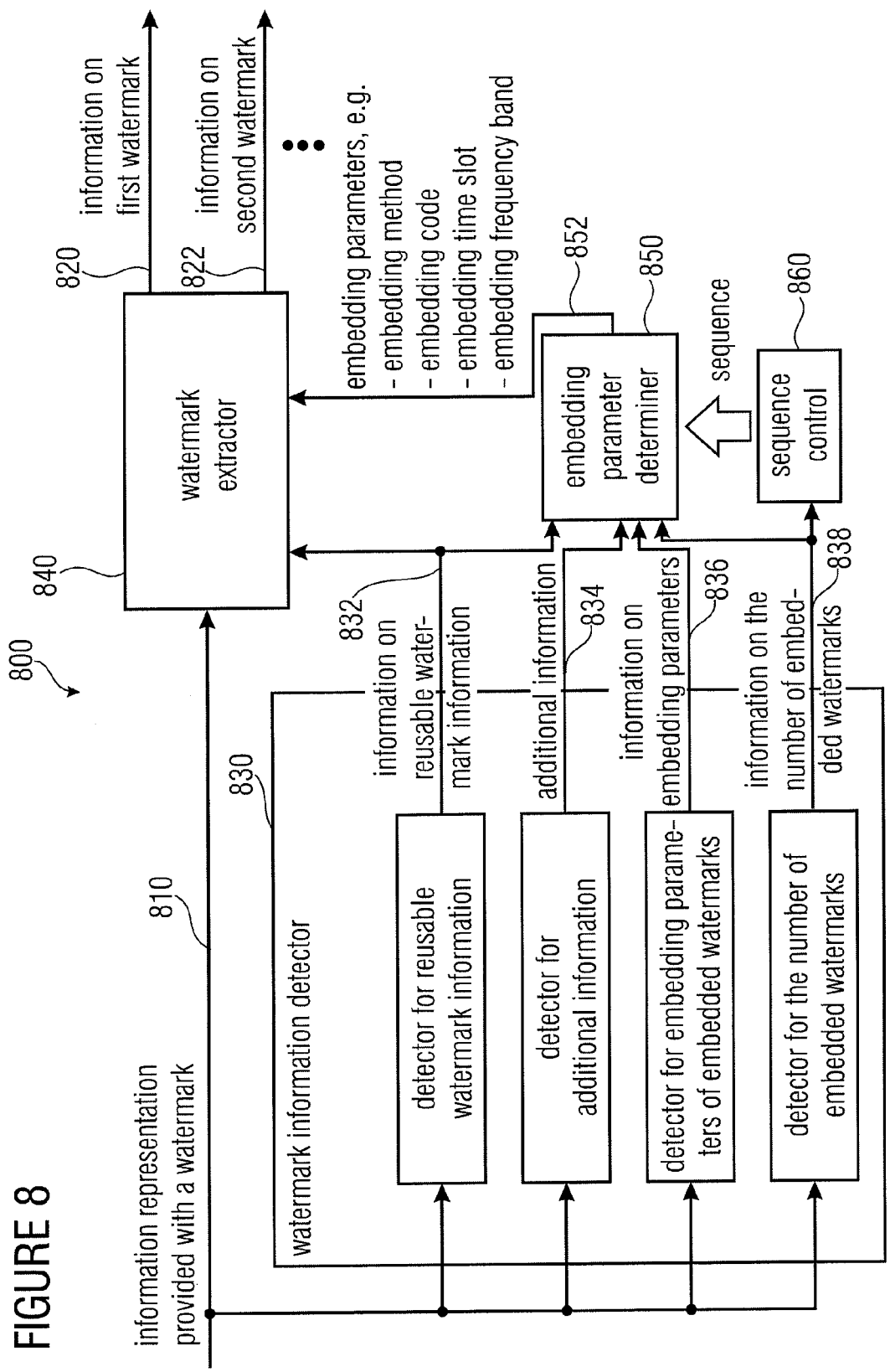
FIG. 8 shows a block diagram of a watermark detector according to an embodiment of the invention.

FIG. 8 shows a block diagram of a detector for extracting a watermark from an information representation provided with a watermark. The detector according to FIG. 8 is designated by 800 in its entirety. The detector 800 is, for example, implemented to receive an information representation 810 provided with a watermark and to provide at least one watermark contained in the information representation 810. In some embodiments, the detector 800 may be implemented, however, to provide information on a plurality of watermarks contained in the information representation 810. For example, the detector 800 may be implemented to provide information 820 on a first watermark and to provide information 822 on a second watermark.

The detector 800 includes, for example, a watermark information detector 830 which is implemented to receive the information representation 810 provided with the watermark and to provide, based thereupon, information on watermark information contained in the information representation 810. For example, the watermark information detector 830 may comprise the same basic functionality as the watermark information detector 730 of the embedder 700. Apart from that, the watermark information detector 830 may, for example, correspond to the detection information detector 220 according to FIG. 2.

Thus, the watermark information detector 830 may, for example, be implemented to provide information 832 on the reusable watermark information. Further, the watermark information detector 830 may be implemented to provide additional information 834, for example corresponding to the additional information 734, based on the information representation 810 provided with at least one watermark. Further, the watermark information detector 830 may be implemented to provide, based on the information representation 810, information 836 on embedding parameters basically corresponding to the information 736, for example. Alternatively or additionally, the watermark information detector 830, based on the information representation 810, may provide information 838 on a number of watermarks embedded in the information representation 810. In this respect it is to be noted that it is, for example, sufficient for the watermark information detector to provide one of the mentioned pieces of information 832, 834, 836, 838. However, there are embodiments in which the watermark information detector provides all mentioned information, wherein in this case an especially powerful overall system results.

The detector 800 further includes a watermark extractor 840 which is implemented to receive the information representation 810 provided with a watermark. The watermark extractor 840 may further be implemented, for example, to receive information 832 on reusable watermark information, as far as such information is provided by the watermark information detector 830. Further, the watermark extractor is, for example, implemented to receive embedding parameter information 852 from an embedding parameter determiner 850. The watermark extractor 840 is thus, for example, implemented, based on the information representation 810 and depending on the information 832 and the embedding parameters 852, to extract at least one watermark and to provide corresponding information 820 on the extracted watermark. A synchronization of the watermark extractor 840 may here, for example, take place through the information 832 on reusable watermark information if the information 832, for example, relates to the presence of synchronization information. In this case, for example, the watermark extractor 840 may be instructed by the information 832 to extract two different watermarks using the same synchronization information. If only one watermark is to be extracted, for example the evaluation of the information 832 on reusable watermark information may be rendered unnecessary.

The embedding parameter determiner 850 may, for example, be implemented to determine the embedding parameters or detection parameters 852 based on the information 832, 834, 836, 838. The embedding parameter determiner 850 may, of course, also evaluate only one of the mentioned pieces of information 832, 834, 836, 838 to determine the embedding parameter 852. The embedding parameter determiner 850 is, for example, implemented to set the embedding parameters 852 such that a watermark is extracted from the information representation 810 which is actually contained in the information representation 810 or the presence of which is indicated by at least one of the pieces of information 832, 834, 836, 838. In other words, the embedding parameter determiner 852 may, for example, be configured to prevent the attempt to extract a watermark from the information representation 810 which is not contained in the information representation 810 or the presence of which is not indicated by at least one of the pieces of information 832, 834, 836, 838. Thus, the embedding parameter determiner 852, based on the information 832, 834, 836, 838 may control the watermark extractor 840 to extract the existing watermarks pointedly. Thus, a substantial advantage regarding power or advantage regarding speed may be achieved as compared to arrangements in which the information representation 810 is searched for any possible watermarks.

The detector 800 further includes, for example, a sequence control 860 which is implemented, for example, to control an extraction of several watermarks. The sequence control 860 may, for example, be configured to terminate a watermark extraction from the information representation 810 when all watermarks assumed to exist in the information representation 810 have been identified. If the watermark information detector 830, for example, provides information 838 on a number of watermarks embedded in the information representation, then, for example, the sequence control 860 may terminate a search for watermarks in the information representation if a number of watermarks has been identified which is the same as the number described by the information 838. Although the watermark information detector 830 may fail when providing the information 838, i.e. for example indicates the presence of less watermarks than are actually contained in the information representation 810, the information 838 may still in many cases be regarded as a reliable termination criterion for terminating a search for further watermarks. By a corresponding sequence control terminating the search for watermarks depending on the information 838, apart from that an unnecessary and futile search for further watermarks may be avoided if, for example, all watermarks have already been extracted by the watermark extractor 840.

It may be gathered from the above description that the detector 800 offers substantial advantages as compared to conventional detectors. By employing reusable watermark information, a watermark extraction may be accelerated. By employing the information provided by the watermark information detector 830, apart from that the search for embedded watermarks may take place in a very systematic way, so that, for example, only actually existing watermarks are extracted, and a futile search for non-existing watermarks is not necessitated.

Further advantages may, for example (optionally), be achieved when the embedding parameter determiner 850 is implemented to determine one or several embedding parameters using a one-way function. Here, for example, the initial value may be given, and the information 838 on the number of embedded watermarks may be used in order to decide how often the one-way function is to be applied to the initial value. If the information 838 indicates, for example, that three watermarks are contained in the information representation 810, the one-way function may, for example, be applied to the initial value once to obtain the extraction parameters for the extraction of the first watermark. Extraction parameters for the extraction of the second watermark are, for example, obtained by applying the one-way function again to the value which was obtained by the first application of the one-way function to the initial value. Thus, for example, a detection parameter for the extraction of a subsequent watermark may be derived from the detection parameters for the extraction of a preceding watermark, which leads to an especially efficient realization of a mechanism for determining the detection parameters.

Apart from that, it is to be noted that the terms embedding parameter and detection parameter may be basically used synonymously regarding the detection of a watermark. If, for example, embedding parameters are known, using which a watermark was embedded into an information representation or into an information signal, in many cases it may be assumed that thus also detection parameters are known, using which the watermark may be detected or extracted again. Determining or detecting of extraction parameters or detection parameters thus in many cases corresponds to the determination of embedding parameters.

Figure 9:
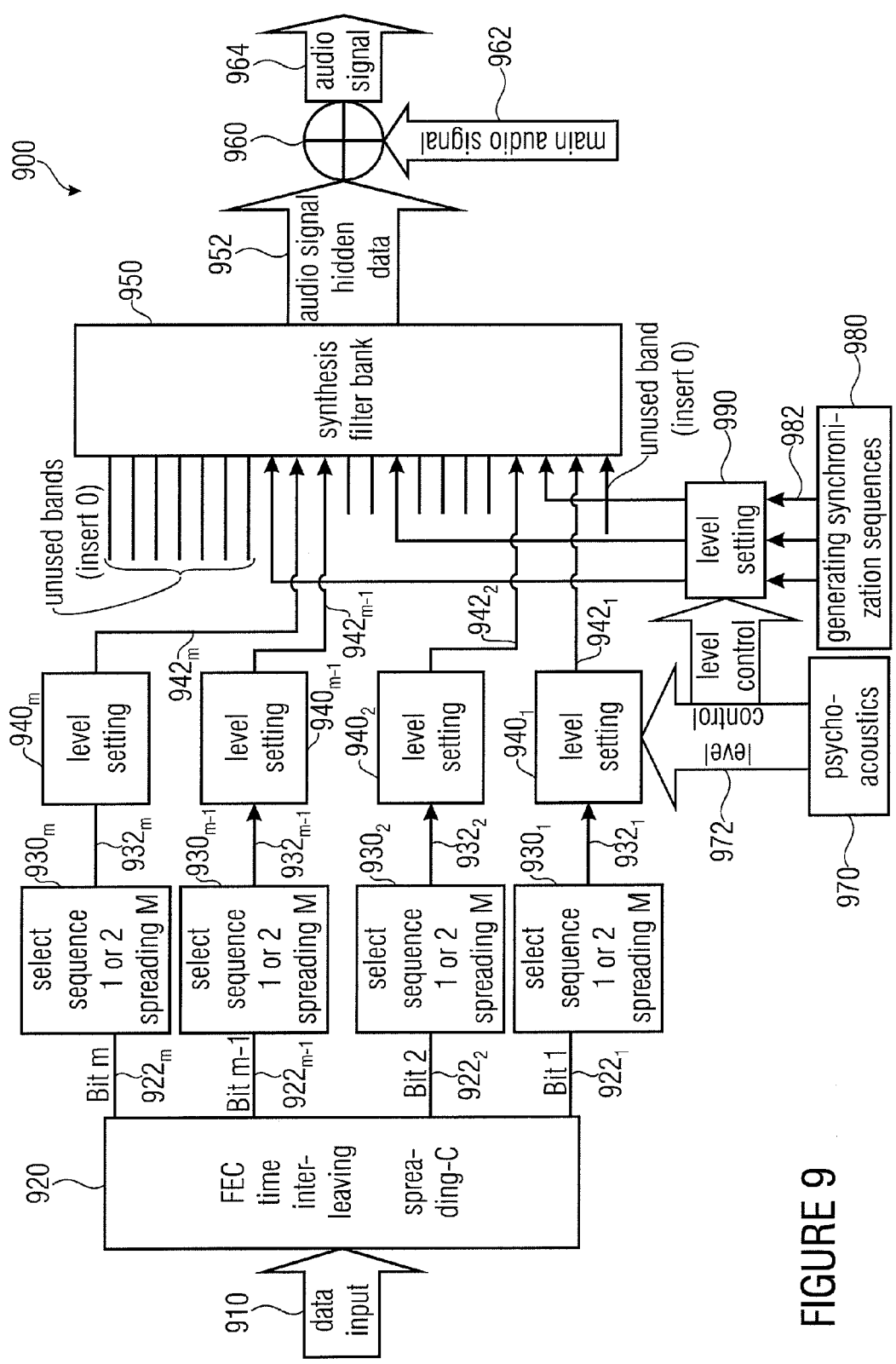
FIG. 9 shows a block diagram of a watermark embedder according to an embodiment of the invention.

FIG. 9 shows a block diagram of an embedder for embedding a watermark into an audio signal. The embedder according to FIG. 9 is designated by 900 in its entirety. The embedder 900 is implemented to embed watermark information, i.e. for example a useful signal which is to be embedded into a watermark, via a data input 910. The embedder 900 further includes a data stream generator 920 which is implemented to receive the watermark useful information from the data input 910 and to generate, based thereupon, a parallel data stream, for example including m bits. The data stream generator 920 is, for example, implemented to apply a forward error correction (FEC) to the watermark useful information from the data input 910, to obtain an error-protected data stream representing the watermark useful information. Further, the data stream generator 920 is, for example, implemented to apply a time interleaving to the error-protected data stream to thus obtain a time-interleaved data stream. The time-interleaved data stream is less prone to certain errors (e.g. bundling errors) than the mere error-protected data stream. Further, the data stream generator 920 is, for example, implemented to spread the interleaved data stream with a first spread code (spread code C). For example, the data stream generator 920 may be implemented to generate a plurality of bits from one bit of the time-interleaved data stream by applying a spread code. Thus, from the watermark useful information from the data input 910 a once spread data stream results, as is, for example, known from telecommunications. In summary it may be noted that the once spread data stream, by applying a forward error correction (FEC), by applying time interleaving and by applying a first spread procedure using spread code C, results from the watermark useful information from the data input 910. The individual bits of the once spread data stream are then divided into a parallel data stream, for example including m parallel data streams having associated bits (bit 1, bit 2, . . . , bit m−1, bit m). The mentioned bits are, for example, designated by $922_1$-$922_m$. Each of the parallel bits $922_1$-$922_m$ is then subjected to spreading. The corresponding spreading takes place in respective spreaders $930_1$-$930_m$. In one of the spreaders $930_1$-$930_m$, for example, depending on the value of the associated bit $922_1$-$922_m$, a first sequence (sequence 1) or a second sequence (sequence 2) is selected. The first sequence and the second sequence may, for example, be complementary to each other. The sequences may, for example, be a spread sequence M and the inverse of the spread sequence M. Thus, for example, each bit $922_1$-$922_m$ is spread by the associated spreader $930_1$-$930_m$ so that, for example, m spread bit sequences $932_1$-$932_m$ result. The spread bit sequences $932_1$-$932_m$ are then supplied to respective level setters $940_1$-$940_m$ so that corresponding level-controlled and spread bit sequences $942_1$-$942_m$ result. In one embodiment, a level of each level-controlled, spread bit sequence $941_i$ is individually settable as compared to the level of the associated non-level-controlled spread bit sequence $932_i$ (i=1, . . . , n). However, a level setting may also take place for a group of spread bit sequences together.

The embedder 900 further includes a synthesis filter bank 950 which may, for example be implemented to execute an inverse Fourier transformation. The synthesis filter bank 950 is, for example, configured to receive the level-controlled and spread bits $942_1$-$942_m$. Further, the synthesis filter bank 950 may additionally be implemented to receive one or several (e.g. level-controlled) synchronization frequencies. The synthesis filter bank 950 is thus, for example, implemented to receive the level-controlled bit sequences $942_1$-$942_m$ and the level-controlled synchronization bit sequences, for example as frequency range input signals and, based thereupon, for example by forming an inverse Fourier transformation, generate a corresponding time signal 952.

The embedder 900 further includes a summator 960 which is, for example, implemented to add the output signal 952 of the synthesis filter bank 950 to a main audio signal 962 to obtain an audio signal or sum audio signal 964 provided with a watermark (according to the watermark useful information).

The embedder 900 further includes, for example, a psychoacoustic control unit 970. The psychoacoustic control unit 970 is, for example, implemented to receive the main audio signal 962 and to generate level control signals 972 for the level setters $940_1$-$940_m$. For this purpose, the psychoacoustic unit 970 may, for example, process the main audio signal 962 to determine masking thresholds in the main audio signal. In other words, the psychoacoustic unit 970 may, for example, determine according to a psychoacoustic model how loud a signal (e.g. the output signal 952 of the synthesis filter bank 950) added to the main audio signal 962 may be in different frequency bands, so that no substantial interference results in the sum audio signal 964. The psychoacoustic unit 970 is thus, for example, implemented to set the level setter $940_1$-$940_m$ such that an interference of a hearing impression in the sum audio signal 964 by the output signal 952 of the synthesis filter bank 950 does not exceed a certain boundary. In other words, the output signal 952 of the synthesis filter bank 950 ought to be embedded into the main audio signal 962 so that the signal 952 only slightly impairs a hearing impression caused by the sum audio signal 964 as compared to a hearing impression caused by the main audio signal 962.

The embedder 900 further includes, for example, a synchronization sequence generator 980 which is implemented to generate one or several bit sequences, for example serving for a synchronization in a watermark extraction from the sum signal 964. The synchronization sequence generator 980 thus generates one or several synchronization sequences 982 which are, for example, in a level setter 990, subjected to a level setting (for example controlled by the psychoacoustic unit 970). Thus, level-controlled synchronization sequences result which, as explained above, may be supplied to the synthesis filter bank 950.

The embedder 900, as already indicated above, may be improved in different ways. For example, the synchronization sequence generator may be controlled depending on whether a synchronization sequence is already present in the main audio signal 962. In other words, the main audio signal 962 corresponds, for example, to the input information representation 110 according to FIG. 1, the input information representation 310 according to FIGS. 3a-3c, the input information representation 510 according to FIG. 5 or the input information representation 710 according to FIG. 7a. If the embedder 900 is thus provided with a corresponding watermark information detector which is implemented to identify a synchronization signal present in the main audio signal 962, the synchronization sequence generator 980 may, for example, be activated or deactivated depending on the presence of a synchronization signal in the main audio signal 962. If, in the main audio signal 962, a synchronization sequence already exists, no additional synchronization sequence has to be embedded into the audio signal. Further, apart from that, also the generation of the bit streams (e.g. the bit streams $922_1$-$922_m$ and the bit streams derived therefrom) may be synchronized with the synchronization signal detected in the main audio signal 962.

Further, parameters of the embedder 900, for example the used spread sequences or the frequency bands used for the generation of the signal 952, may be set depending on information describing a watermark contained in the main audio signal 962.

Apart from that, the selection of these parameters used by the embedder 900 may be done using an embedding parameter, as was explained, for example, with reference to FIGS. 5 and 7a.

Regarding details as to how spreading a signal using different spread codes may be achieved, reference is, for example, made to the textbook "Digital Communication" by J. G. Proakis (third edition, Mc Graw-Hill, New York, 1995). Also adding a forward error correction and time interleaving are described in the above-mentioned book and further in the conventional textbooks on telecommunications. Also the realization of a synthesis filter bank, for example executing an inverse Fourier transformation or a similar transformation, may be gathered from the telecommunication textbooks.

Figure 10:
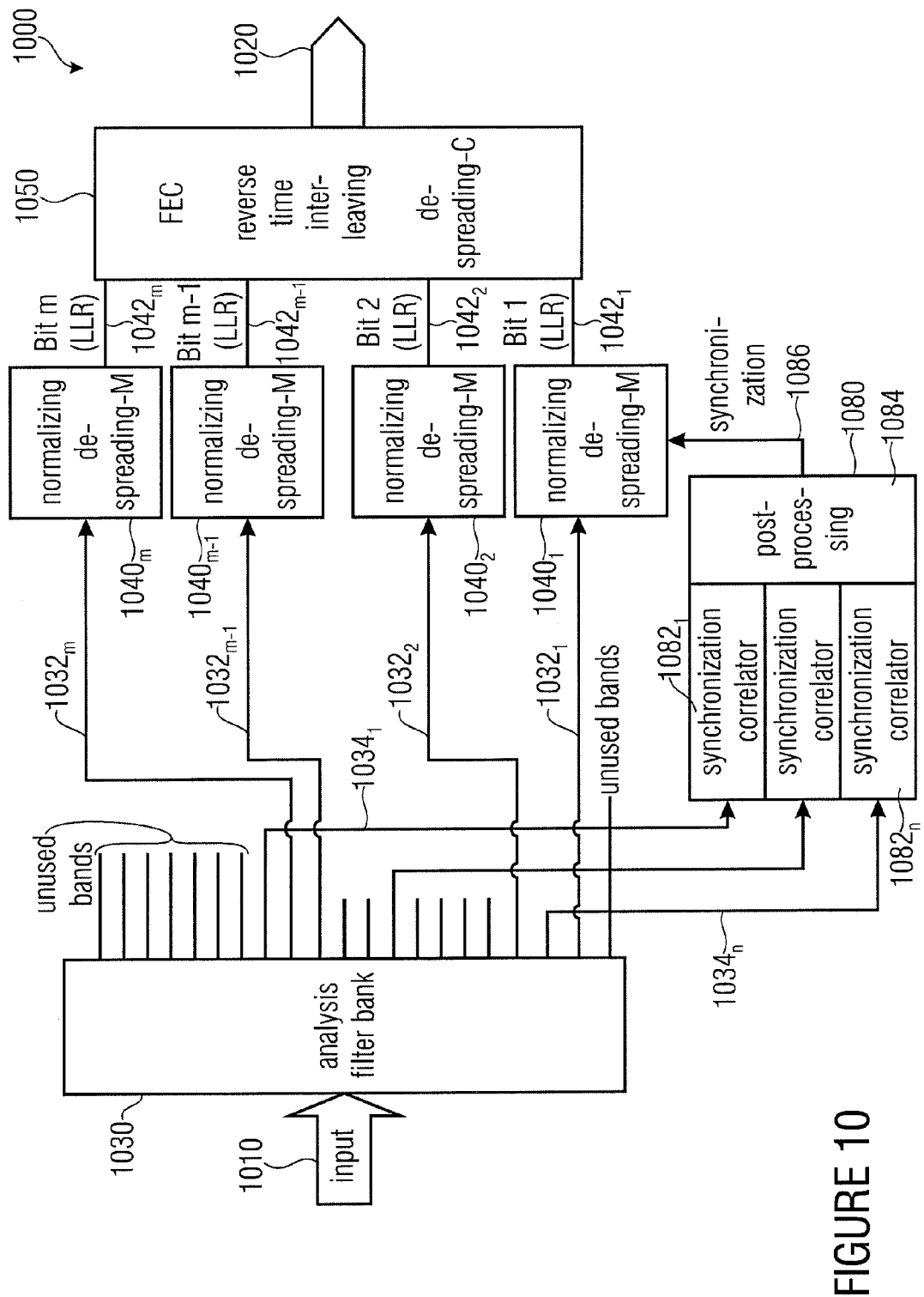
FIG. 10 shows a block diagram of a watermark detector according to an embodiment of the invention.

FIG. 10 shows a block diagram of a watermark detector according to one embodiment of the invention. The watermark detector according to FIG. 10 designated by 1000 in its entirety. The watermark detector 1000 is implemented to receive an audio signal provided with at least one watermark at a signal input 1010 and to form, based thereupon, a watermark useful information 1020. The detector 1000 includes an analysis filter bank 1030 which is implemented to receive the audio signal provided with the watermark and divide the same into individual spectral bands. For example, the analysis filter bank 1030 may be implemented to execute a Fourier transformation or a fast Fourier transformation. At an output of the analysis filter bank, thus, for example, individual signals for a plurality of bands are applied, some of which serve as useful signal frequency band signals $1032_1$-$1032_m$ and some of which serve as synchronization frequency band signals $1034_1$-$1034_n$. The detector 1000 further includes a plurality of, for example, m despreaders and normalizers $1040_i$. An i-th despreader and normalizer $1040_i$ may, for example be implemented to correlate an associated useful signal frequency band signal 1034 to a detection spread code (in general: a detection code or extraction code) to thus reverse the spreading by the spreader $930_1$-$930_m$. By the correlation with the corresponding spread code, or detection code or extraction code, for example one bit may be detected. The detection of the bit may, apart from that, also include normalizing, for example to reverse the level setting in the embedder-side level setters $940_1$-$940_m$. At the outputs of the despreaders and normalizers $1040_1$-$1040_m$, for example bit information $1042_1$-$1042_m$ may be applied, for example carrying bit information normalized and despread by the despreader and normalizer $1040_1$-$1040_m$. The detector 1000 further includes a watermark recovery unit 1050, for example implemented to receive the bit signals $1042_1$-$1042_m$ and to recover based thereupon the watermark useful information 1020. The watermark recovery unit 1050 may, for example, comprise a despreader which is, for example, implemented to reverse the spreading (Spreizen-C; spreading C) executed in the bit stream generator 920 of the watermark embedder 900. The watermark recovery unit 1050 may further comprise, for example, a de-interleaver which is implemented to reverse the time interleaving of bits executed in the bit stream generator 920. Further, the watermark recovery unit 1050, for example, includes an error corrector, or a forward error correction, which is implemented to use the error correction information added by the bit stream generator 920 to thus obtain the watermark useful information 1020 based on the bit signals $1042_1$-$1042_m$, so that in the watermark useful information 1020 the effects of bit errors in the bit signals $1042_1$-$1042_m$ are reduced or eliminated.

The decoder 1000 further includes a synchronizer 1080 which is implemented to receive the synchronization signals $1034_1$-$1034_n$. The synchronizer includes, for example, one or several synchronization correlators $1082_1$-$1082_n$, wherein the synchronization correlators $1082_1$-$1082_n$ are implemented to receive respective synchronization signals $1034_1$-$1034_n$ and correlate the same with a predetermined synchronization signal detection code. Thus, the synchronization correlators $1082_1$-$1082_n$ may detect the presence of a synchronization mark in the synchronization signals $1034_1$-$1034_n$. The synchronization unit 1080 further includes, for example, a post-processing 1084 which is, for example, implemented to receive, from the synchronization correlators $1082_1$-$1082_n$, information on whether a correlation between the synchronization signals $1034_1$-$1034_n$ and predetermined synchronization codes reaches or exceeds a threshold value to provide, based on the information provided by the synchronization correlators $1082_1$-$1082_n$, an extracted synchronization signal 1086 which indicates a position, regarding which a synchronization mark occurs in the synchronization signals $1034_1$-$1034_n$.

The extracted synchronization signal 1086 is then, for example, supplied to the despreaders and normalizers $1040_1$-$1040_m$ to synchronize the function of the despreaders and normalizers $1040_1$-$1040_m$ with the synchronization information contained in the input signal 1010.

The decoder 1000 may be expanded in many ways to achieve one or several of the above-described additional functionalities. For example, the decoder 1000 may be supplemented by a detector which is implemented to identify reusable information in the input signal 1010 and to provide the reusable identification for an extraction of several watermarks. If the detector, for example, detects for the reusable information that in the input signal 1010 synchronization information is contained which may be used for a detection or extraction of several watermarks, the detector may provide the corresponding information (e.g. the corresponding synchronization information) for the detection of several watermarks. In this case, for example, a first set of despreaders and normalizers may receive the reusable information (e.g. synchronization information) to extract a first watermark. A second set of despreaders and normalizers may receive the reusable information to extract a second watermark. The first set of despreaders and normalizers is, for example, configured to detect a watermark which is embedded according to a first embedding method or according to a first embedding code into the input information 1010. The second set of despreaders and normalizers may further, for example, be implemented to extract from the input information 1010 a watermark which, according to a second embedding method or using a second embedding code, is embedded into the input information 1010. Thus, the reusable information may again be used and a one-time detection of the synchronization information for a detection of several different watermarks is sufficient (e.g. embedded using different embedding methods or using different embedding codes).

Further, in the decoder 1000 different advantageous concepts may be used to set extraction parameters used for the extraction of a watermark. For example, the detector 1000 may include a watermark information detector, for example corresponding to the watermark information detector 830 of the detector 800. Further, the detector 1000 may, for example, comprise an embedding parameter determiner, for example basically corresponding to the embedding parameter determiner 850 of the detector 800. Apart from that, the detector 1000 may also comprise a sequence control, for example basically corresponding to the sequence control 860 of the detector 800.

Thus, it may, for example, be determined by the embedding parameter determiner which detection code is used for despreading the signals $1032_1$-$1032_m$. Alternatively or additionally, it may, for example, be determined by the embedding parameter determiner which detection code is used for despreading the signals $1042_1$-$1042_m$ in the watermark recovery unit 1050. Alternatively or additionally, it may also be determined by the embedding parameter determiner which length the corresponding detection codes for despreading the corresponding signals comprise. Apart from that, also information regarding how the time interleaving in the watermark recovery unit 1050 may be reversed may be determined by the embedding parameter determiner. Apart from that, by the embedding parameter determiner also different detection methods for different watermarks may be determined. Apart from that, the embedding parameter determiner may, for example, also provide information on which frequency bands are to be used for the extraction of the watermark.

In the following, briefly some details regarding an overall system consisting of the embedder 900 and the detector 1000 are described. At the input of the embedder 900, for example, PCM-encoded audio signals or audio signals encoded according to a pulse code modulation are applied. This audio signal (for example the main audio signal 962) is analyzed using a psychoacoustic method, for example by the psychoacoustic unit 970. The psychoacoustic method, for example, guarantees inaudibility of the watermark to be embedded or sees to it that the watermark to be embedded is only perceived very weakly. Data to be transmitted, for example applied to the data input 910, are added to the original audio signal (or the main audio signal 962). The embedder 900 is, for example, not exclusively targeted to offline signal processing, i.e. for broadcasting applications also a real-time embedding may take place. Only by internal block processing a certain delay may, for example, be expected.

The input signal at the input 1010 of the extractor may, for example, be recorded by a microphone. This microphone of the extractor may, for example, comprise a frequency response from 10 Hz to 10 kHz (typically with a frequency response of +/−5 dB). As a suitable sampling rate, 24 kHz may, for example, be selected.

In the following, a basic functioning of the embedder 900 or the extractor 1000 is described. A useful band for watermark transmission is, for example, delimited by the microphone of the extractor to a frequency range from 100 Hz to 10 kHz. A lower boundary frequency of the useful band is, for example, designated by fmin. An upper boundary frequency is, for example, designated by fmax. In some embodiments, the following applies: fmin<100 Hz and fmax>10 kHz. A frequency band from 0 to fmax is, for example, divided into M subbands of equal width, and in these subbands watermark partial signals are transmitted. A subband having the number k for example extends from (k−1)*fmax/M to k*fmax/M, with k=1, 2, . . . , M. Due to an attenuation of the microphone at low frequencies, for example the subband having the number 1 (k=1) is not used for data transmission. A watermark may thus consist of M−1 subband signals. These subband signals are converted into the individual subbands by means of a synthesis filter bank. A sampling rate of these subband signals at an input of the synthesis filter bank, for example designated by fs1, is a fraction of a sampling rate at the output (fs1:=24/K kHz, K being an integer number).

As in one embodiment, in the watermark extractor 1000, the subband signals (i.e., e.g., the signals 1032$_1$-1032$_m$ or 1034$_1$-1034$_m$) are further processed at a sampling rate fs1, with regard to a favorable realization of the watermark extractor it may be sensible to select fs1 to be as small as possible. A bandwidth of the subbands may, for example, be fmax/M, wherein fmax may, for example, be smaller than 10 kHz. According to the sampling theorem, for example the condition fs1≥2 fmax/M has to be fulfilled. Thus, for example for a quotient 24 kHz/fs1 of the two sampling rates, the following applies:

$$24\ \text{kHz}/fs1 \geq M*12\ \text{kHz}/fmax.$$

An efficient implementation of the synthesis filter bank 950 is, for example, possible when the quotient 24 kHz/fs1 is an integer multiple of M. As fmax=12 kHz is not an option, for example fmax=6 kHz is selected. Apart from that, M=16 is set, for example. A bandwidth of one single subband is thus 375 Hz, and from the request for a minimum sampling rate for example fs1=750 Hz results.

The M−1 subband signals (for example the signals 942$_1$-942$_m$) together with the signals provided by the synchronization generator 980 and the level setter 990 contain, for example, encoded information (for example the useful information of the watermark) and known training symbols which may, for example, be used on a receiver side, i.e., for example, in the watermark extractor, for synchronization. In one embodiment, in every subband data symbols may be transmitted with synchronization symbols in a time multiplexing. In another embodiment, however, data symbols and synchronization symbols are transmitted in separate subbands. There are thus r synchronization signals (e.g. with r=3) and M−1−r data signals. The corresponding subbands are thus also referred to as data channels or synchronization channels.

An output signal of the synthesis filter bank 950 is, for example, the actual watermark (including synchronization information and watermark useful information), added to the audio signal (e.g. to the main audio signal 962). For the watermark not to be audible, for example the individual subband signals (for example the signals 932$_1$-932$_m$ or 982) may still be changed in the amplitude (i.e., e.g., decreased). This time-variable weighting (for example by the level setters 940$_1$-940$_m$ or 980) depends, for example, on the respective audio signal (e.g. on the main audio signal 962) and on the psychoacoustic perception of a person. In this connection, reference is made to psychoacoustic weighting.

FIG. 9 shows, for example, the basic setup of the watermark embedder. The encoded bits (0 and 1) (for example represented by the bit signals 922$_1$-922$_m$) are represented, for example, by two orthogonal spread sequences of the length Spreizen-M (spreading-M) (e.g. spreading-M=32). These spread sequences consist, for example, of the symbols +1 or −1. Thus, the subband data signals before a psychoacoustic weighting (PAW) are BPSK signals (each with a power of 1). Also the synchronization signals before the psychoacoustic weighting are, for example, BPSK signals (each power 1).

In the following, briefly the mechanisms each regarding the forward error correction (FEC), the spreading (spreading-M) and the synchronization frequencies are described. For details, reference is made to the textbook "Digital Communications" by J. G. Proakis (3$^{rd}$ Edition, Mc Graw-Hill, New York, 1995).

The bit stream generator 920 consists, for example, of three parts, or implements three processing steps:

1. convolution encoder or turbo encoder having the code rate R
2. spreading by the factor Spreizen C (spreading-C)
3. time interleaver (interleaver).

The encoder (convolution encoder or turbo encoder) for example generates n>k encoded bits from k information bits. A code rate is, for example, defined as a quotient R=k/n. If, for example, the case k=1 is considered, it is assumed that 1<n≤5 applies.

Lower code rates may, for example, be generated by a spreading of the encoded bits with a bit sequence of the length spreading-C. Here, for example, each code bit of the value 1 is replaced by the bit sequence sc[k], and each code bit of the value 0 is replaced by the negated bit sequence sc$_{not}$[k] (k=0, 1, . . . , spreading-C−1). An effective code rate is then, for example, R/spreading-C. For example, for R=1/3 and spreading-C=12 an effective code rate of 1/36 results. In this number example, an information bit is represented by 36 code bits. By the interleaver, the sequence of the code bits is changed in a defined way. Using an inverse operation, the reversal of the interleaving (de-interleaver), the bits in the receiver (watermark extractor) are again brought into the correct order.

In the following, briefly the spreading "Spreizen-M" (spreading-M) is described. In one embodiment, the encoded bits (0 or 1) coming from the bit stream generator 920 or from the forward error correction (FEC) are represented by two orthogonal spread sequences of the length spreading-M (e.g. spreading-M=32). These spread sequences consist of the symbols +1 or −1. Thus, for example the subband data signals before the psychoacoustic weighting are BPSK signals (each with the power of 1).

For example, s0[k] or s1[k] (k=0, 1, . . . , spreading-M−1) are the spread sequences represented by a zero or a one, respectively. Orthogonality here means that the inner product <s0, s1>=0.

In the following, some more details regarding the synchronization sequences are described, as they are provided by the synchronization sequence generator 980, and as they are, for example, evaluated by the synchronization unit 1080. For a decoding of the data on the receiver side (for example in the watermark extractor) it is, for example, advantageous when points in times are known at which a code word beings. These points in time may, for example, be determined by a transmission of known sequences and by a correlation to these sequences in the receiver. These sequences are, for example, transmitted on the synchronization channels. Here, for example, the following procedure may be chosen:

A sequence p[k] (k=0, 1, ..., L−1) is generated by L BPSK symbols with good autocorrelation characteristics. By a periodic repetition of p[k], it results for the signal u[n]:=p[n modulo L] (n=0, 1, ... ). In the embodiment, on all synchronization channels the same signal u[n] is transmitted.

In the following, briefly some details regarding the psychoacoustic weighting are described. It is, for example, enabled by a spread band modulation to reduce the average signal power by spectral spreading. Additionally the data signal is evaluated and modified according to psychoacoustic principles. Thereby, for example, the inaudibility of the signal added to the original audio signal 962 is guaranteed. This inaudibility of the watermark information in the combined audio signal 964 is, for example, guaranteed by the use of the level setters 940₁-940ₘ and 990 under the control of the psychoacoustic unit 970, as already explained briefly above. A detailed description is omitted here, as the same is not essential for understanding the present invention.

In the following, some details regarding the watermark detector or watermark extractor 1000 are described. The watermark-including audio signal, for example generated by the embedder 900, may, for example, be distributed conventionally via existing transmission channels (e.g. via broadcasting or also via the internet) and is, for example, finally supplied to the watermark detector or watermark extractor 1000.

An input signal at the input 1010 of the detector 1000 includes, for example, a sum signal transmitted via the audio channel (for example the combined audio signal 964) including an audio signal and a watermark.

By the analysis filter bank 1030 the input signal is, for example, divided by the input 1010 into M subband signals at a sampling rate of, for example, 12/M kHz. The signals in the unused subbands (e.g. subbands Nos. 17-32) are, for example, not calculated. The subband signal No. 1 is, for example, calculated but not evaluated, however, as it does not carry any information. The remaining M−1 subband signals, for example, are divided into M−1−r data signals, for example, and r synchronization signals and subsequently further processed.

From the synchronization signals (for example from the signals 1034₁-1034ₘ) points in time are determined, for example, by means of correlation, at which the data signals (for example the signals 1032₁-1032ₘ) are despread (Entspreizen-M; despreading-M).

Output signals of the blocks 1040₁-1040ₘ designated by despreading-M are, for example, logarithmic likelihood ratios (LLR), i.e. soft bits. A positive logarithmic likelihood ratio (LLR) indicates one bit is a logical one, and a negative logarithmic likelihood ratio (LLR) indicates, for example, that this is a logical zero. The higher the amount of a logarithmic likelihood ratio, for example, the more reliable the value.

The logarithmic likelihood ratios are, for example, further processed in the watermark recovery unit 1050 or in a forward error correction (FEC).

In the following, reference is briefly made to the characteristics of the received subband signals (for example the signals 1032₁-1032ₘ and 1034₁-1034ₘ). Here, $x_k[n]$ (k=1, 2, ..., M) are the subband signals in the watermark embedder after spreading (spreading-M) and before psychoacoustic weighting. $y_k[n]$ (k=1, 2, ..., M) are the output signals of the analysis filter bank. The signals $x_k[n]$ are interfered with by three effects:
- psychoacoustic weighting
- audio signal
- audio channel.

For the received signals (for example received by the decoder 1000) generally, for example, the following applies:

$$y_k[n] = c_k[n] * x_k[n-D] + r_k[n] \ (k=1,2,\ldots,M).$$

Here, $c_k[n]$ is a (time-dependent) channel coefficient and $r_k[n]$ is additive noise. The effects of distortions are, for example, characterized by an average signal-to-noise ratio per channel, or by a mean signal/noise ratio averaged across all channels.

A useful signal from the point of view of telecommunications is, for example, the signal $x_k[n-D]$. The rest are noise-type interferences. The ratio of effective power C to interference power N, i.e. C/N, generally expressed in decibel, is, for example, the signal/noise ratio.

In the following, a synchronization in the detection of a watermark or a processing of synchronization signals (for example a processing of the synchronization signals 1034₁-1034ₘ) is briefly described. In one embodiment, a transmitted synchronization sequence p[k] (k=0, 1, ..., L−1) is known. In the following, x[n] refers to the input signal and y[n] to the output signal of a correlator for synchronization. The output signal is, for example, calculated by a filtering of the input signal with an FIR filter of an impulse response p[L−1−n] (n=0, 1, ..., L−1), i.e. according to the regulation $$y[n] = \sum_{k=0}^{L-1} p[L-1-k]x[n-k].$$

Output signals of the individual correlators are, for example combined ("post processing") to determine the position of a correlation peak. From the location of the correlation peak, for example, the positions of the synchronization sequence p[k] within the synchronization signals may be determined. From these positions, for example, the starting times for despreading may be derived (entSpreizen-M; despreading-M). This information (for example information 1086) is passed on from the synchronization unit 1080 to the despreading-M blocks 1040₁-1040ₘ.

In the following, the procedure for despreading-M is described. A processing unit designated by despreading-M (for example one of the processing units 1040₁-1040ₘ), from a block of input values Spreizen-M (spreading-M), calculates exactly one output value (for example in the form of a logarithmic likelihood ratio LLR). This is described in the following.

In the following, for example, x[n] (n=0, 1, ..., spreading-M) are the samples of a block of the length spreading-M at an input of despreading-M (1040₁-1040ₘ). In one embodiment, first of all the power of the block is normalized to one. In this respect, for example, a signal is formed $$y[n] = x[n]/rms_x \text{ mit } rms_x := \sqrt{\frac{1}{\text{Spreizen-}M} \sum_{n=0}^{\text{Spreizen-}M-1} x[n]^2}.$$

The signal y[n] is, for example, despread using a difference s10[n]:=s1[n]−s0[n] of the two spread sequences s1[n] and s0[n]. The result is, for example, a logarithmic likelihood ratio LLR:

$$LLR = \frac{1}{\text{Spreizen-}M} \sum_{n=0}^{\text{Spreizen-}M-1} s10[n]y[n].$$

Due to an orthogonality of the spread sequences (<s0, s1>=0), for example a logarithmic likelihood ratio LLR=1 results for y[n]=s1[n] and a logarithmic likelihood ratio LLR=−1 results for y[n]−s0[n].

In the following, details with respect to a forward error correction or to a watermark recovery are described. The processes described in the following may, for example, be executed in the watermark recovery unit 1050. A forward error correction (FEC) in the watermark extractor 1000 includes, for example, three parts or processing steps:

1. reversing time interleaving (for example by a so-called de-interleaver)

2. despreading by the factor spreading-C (also referred to as "despreading-C"); and 3. forward error correction decoding, for example in an FEC decoder.

In the following, details with respect to reversing time interleaving are described. The de-interleaver, for example, reverses a change executed in the transmitter (or embedder) of a sequence of bits by a corresponding (for example reversed) change of the sequence of the logarithmic likelihood ratio (LLR).

In the following, despreading (Entspreizen-C; despreading-C) is described. A despreading by the factor spreading-C may, for example, be executed in the way described in the following. It is to be noted here that a spread sequence used in the watermark embedder was referred to above by sc[k] (k=0, 1, . . . , spreading-C−1). This sequence consists of zeros and ones. From sc[k], for example according to the regulation $$sc1[k] := 2*sc[k]-1$$

a sequence sc1[k] only consisting of the numbers 1 and −1 is generated. Here, for example, the number sc[k]=0 is mapped into the number sc1[k]=−1, and the number sc[k]=1 is mapped into the number sc1[k]=1. Using the spread sequence sc1[k], for example, the logarithmic likelihood ratios are despread analog to the procedure described with reference to despreading-M.

In the following $x_{LLR}$[n] (n=0, 1, . . . , spreading-C) are the samples of a block of logarithmic likelihood ratios (LLR) at the input of despreading-C. First of all, for example, a power of a block is normalized to 1. In this respect, for example, the following signal is formed $$y_{LLR}[n] = x_{LLR}[n]/rms_x \text{ mit } rms_x := \sqrt{\frac{1}{\text{Spreizen-}C} \sum_{n=0}^{\text{Spreizen-}C-1} x_{LLR}[n]^2}.$$

From the sequence $y_{LLR}$[n], for example using the spread sequence sc1[k], the despread logarithmic likelihood ratios are obtained $$LLR2 = \frac{1}{\text{Spreizen-}C} \sum_{n=0}^{\text{Spreizen-}C-1} sc1[n]y_{LLR}[n].$$

These despread logarithmic likelihood ratios are, for example, shifted into the forward error correction decoder (FEC decoder) and decoded there.

In the following, details with respect to the forward error correction decoder (FEC decoder) are described.

For decoding the logarithmic likelihood ratios (LLR) after despreading-C, for example a forward error correction decoder may be used. For example, the following decoders comprising low complexity and high efficiency are an option:
  turbo decoder (for example with a short code word length);
  Viterbi decoder, for example in connection with a Reed-Solomon decoder (here, for example, in a transmitter or embedder a Reed-Solomon code is put downstream to the convolution code); or
  sequential decoder with a high inflow length (e.g. K=41; for details, see textbook "Digital Communications" by J. G. Proakis).

The logarithmic likelihood ratios after despreading-M and despreading-C, for example with the code rate R (e.g. R=1/3) represent encoded information bits. The forward error correction decoder provides back, for example, at its output the decoded information bits. To decode the information bits with an error likelihood which is as low as possible, it is desirable for the ratio Eb/N0 to be sufficiently high. Here, Eb designates an energy per information bit and N0 a one-sided noise power density. The following applies, for example:

$$Eb/N0/dB=C/N/dB+10*\log 10(\text{Spreizen-}M*\text{Spreizen-}C/R).$$

Here, C/N is an average signal/noise ratio across all data channels at an output of the analysis filter bank 1030, i.e. before despreading-M. The second addend is, for example, the sum of the spreading gain (spreading-M) and the encoding gain (Spreizen-C/R; spreading-C/R). For example, for spreading-M=32, spreading-C=12 and R=1/3, the value of Eb/N0 is above C/N by 30.6 dB.

In the mentioned textbook by Proakis, for example using simulation results for a sequential decoder, it was indicated that a bit error likelihood $P_b$ takes the value Pb=1e−6, for example, for the following values of Eb/N0:
  R=1/3: Eb/N0=2.5 dB;
  R=1/2: Eb/N0=3 dB.

For the turbo decoder the same boundary values apply.

If, for example, a reserve of 2-3 dB is added to the above-mentioned values of Eb/N0 to compensate interfering noise, there is, for example, a request for Eb/N0 to be 5 dB, for example. Referring to the above-mentioned number values for spreading-M, spreading-C and R, for example C/N before despreading-M may be −25 dB.

It may be seen from the above-mentioned description that, in particular by spreading the watermark useful data in embedding and by despreading the watermark useful data in decoding, it may be achieved that the watermark information is, for example, embedded in an audio signal such that the audio signal, by the embedding of the watermark useful information, is only changed in an inaudible or only slightly audible way. By the use of different spread codes it may further be enabled to embed different watermarks into the same audio signal (or into another information representation). A reliable decoding or extraction of the watermark necessitates, however, on the side of the decoder or extractor, the despreading (both despreading-M and also despreading- C) to take place using suitable spread codes which are adapted at the embedder-side spread codes or which correspond to the embedder-side spread codes. With reference to the consideration above, it is obvious that the above-described mechanisms for setting extraction parameters, which are, for example, suitable for the selection of spread codes used for the extraction, may be used advantageously to enable despreading.

In the following, some aspects of the present invention are summarized. The concept described within the scope of the present description may, for example, be used for watermark embedding into carrier data and for the extraction, for example, of embedded watermark data.

In conventional watermark embedding, the watermark embedding takes place, for example, without examining a carrier signal (e.g. an audio signal or an image signal) with respect to existing watermarks. In some embodiments, a watermark has the characteristic of being able to contain several independent watermarks without an influence occurring. Further, it is desirable in some conventional concepts for a detector to know about the embedding information of the different embedders.

If it is desired for a repeated embedding of watermarks to be possible, special requirements exist. For example, each further inserted watermark may not make already existing watermarks unusable. Further, a detector, or watermark detector, has to be able to differentiate the watermarks of different embedders.

From the relevant expert publications, different watermark methods are known. The following watermark methods, for example, can be used in conventional embedders or extractors and also in the inventive embedders or extractors:

narrow band method
    spread band method
    echo hiding
    multi-carrier method
    phase modification.

In conventional methods, several disadvantages can arise. For example, conventionally, every embedder adds information (or watermark information) independently to an information representation (for example to an audio signal). Hence, conventionally, a detector or watermark detector has to perform the complete detection method for every embedder. Further, conventionally, a detector needs to have exact information on the embedder that enables him to detect the watermark. For example, when using a spread band method, a conventional detector needs the spread sequence used by the embedder.

Hence, in a conventional detector, a detection complexity and memory requirements increase with each watermark since a conventional detector attempts, for example, one extraction for every possible embedder. Hence, conventionally, it is not possible that a number of possible embedders is, for example, unlimited (which does not necessarily mean that an unlimited number of watermarks can exist in a carrier signal). Therefore, conventionally, the embedders are frequently limited. If the number of possible embedders is very high, conventionally, all embedders will have to be sought for, even when finally only one watermark is contained (for example in the examined information representation).

Subsequently added embedders are, for example, not known to a conventional extractor and, for example, an update of the detectors is needed when an embedder is subsequently added.

In the following, several aspects of the present invention will be summarized. According to several embodiments of the invention, the detector or watermark detector can share all information and detection methods necessitated for all watermarks as far as possible, which reduces complexity, memory requirements, time requirements, and/or energy requirements. In several embodiments, redundant information does not have to be superimposed in the carrier signal (e.g. the audio signal).

Additionally, in several embodiments, the detector or watermark detector has information on the embedders and can, for example, limit a search for watermarks to the significant detection steps.

In several embodiments, detection information (or detection parameters) can be calculated dynamically by defined derivation steps of the embedder information. Thus, in several embodiments, newly added embedders do not need a subsequent change of the detector information.

In the following, several aspects of different embodiments will be described. The different aspects can be combined within a detector, within an extractor or within an overall system including a detector and an extractor.

1. According to one aspect, prior to every embedding process (or at least prior to several embedding processes), a carrier signal (e.g. an audio signal or an image signal or a video signal or a computer program signal, or generally an information representation) is examined for possibly existing watermarks. If an already existing watermark is detected, then, for example, the new watermarks will be inserted, depending on the original watermark, in a manner that enables the detector to use common computing operations for all watermarks. For example, a synchronization sequence (generally: synchronization information) is not re-embedded, but an existing synchronization sequence (or synchronization information) is used and only the actual data (for example the watermark payload data) are embedded (for example synchronously to the existing sequence or synchronization sequence).

Hence, for example, an extractor has to search for only a single synchronization sequence (or synchronization information) that is the same (or the only one) for all contained watermarks. At the same time, this synchronization sequence can, for example, be an indication for existing watermarks for subsequent embedders.

2. According to one aspect, embedder information is added with a method that is the same for every embedder. In other words, at least two different embedders use the same method for embedding embedder information. The embedder information can, for example, be generation information. The generation information can describe, for example, a number of previous watermarks. Hence, for example, a first embedder can indicate that it has added the first watermark. A second embedder can indicate, for example, that now two watermarks are contained. According to one aspect, this information (i.e. for example the generation information) can be detected independent of the embedder.

3. According to one aspect, the data (or the watermark payload data or watermark payload information) are now added by the embedder (for example to the carrier signal), so that the watermarks do not (or only slightly) influence each other. For that, different methods can be used. For example, a CDMA method or a code multiplex multiple access method) can be used. In a respective spread method, for example, every embedder (of a plurality of embedders) uses its own spread sequence, which is orthogonal to the sequences or spread sequences of other embedders. The data share, for example (but not necessarily), a common frequency domain and also a common time domain.

Alternatively (or additionally), embedding can be performed in time multiplex, frequency multiplex or by using a combination of the same. Since the sequences overlap, for example when using the CDMA method, an overall embedded signal energy will increase with every further watermark. Thereby, for example, the watermark energy can increase to such an extent that detection of the watermark becomes more likely. According to one aspect, every watermark can be embedded in a different frequency band or in a different time slot to avoid an overlay. Here, it is advantageous when every embedder knows what watermarks are already contained, so that no overlay takes place (or only takes place to an acceptable extent). In other words, here, the above-stated generation information is not only helpful for the detector, but for every further embedder.

If multiple embedding of watermarks is to take place, further embedders will start again, for example, at point 1.

4. In several embodiments, the detector extracts, similar to every further embedder, the embedder information (that comprises, for example, information on the embedding parameters used by the embedder or the detection parameters to be used by the detector). According to one aspect, a detector can read out the generation information of all embedders in the same manner with the same method or the same spread sequence.

Information that can be used for all watermarks (also referred to as reusable information) can, for example, also be obtained from the carrier signal. For example, a synchronization signal valid for all watermarks (or at least for a plurality of watermarks) can be obtained from the carrier signal. Further, based on the embedder information, contained watermarks can be specifically searched for (e.g. by the detector).

5. Since a conventional detector does not have any information on how many watermarks are contained in the carrier signal, the detector would have to search for all possible embedder information. In order to solve this problem, this number (i.e. the number of possible watermarks) can, for example, be limited in advance. According to one aspect of the invention, however, a certain time slot (or another resource) can be left unoccupied, for example following the synchronization sequence, where every embedder, for example, is allowed to insert generation information.

According to one aspect, it is advantageous that the embedding method (for several embedders) is the same. For example, every embedder of generation information can use the same synchronization band. Further, for example, every embedder of generation information can use the same spread sequence or the same embedding method. Therefore, for example, an extractor can read out the generation information of all embedders (or at least a plurality of embedders) with the same method (or the same spread sequence) in the same manner without increasing the extraction complexity. Therefore, it is advantageous when the embedding method for the generation information is identical for all embedders.

Based on the knowledge of the generation information (i.e. the number of watermarks) an extractor knows, for example, exactly how many watermarks it has to search for. A (conventionally frequently occurring) useless search for non-existing watermarks is hence unnecessary.

According to a further aspect, so-called derivation functions can be used for embedder information. Details regarding this will be summarized below. In a spread band method, an embedder embeds this sequence (for example a spread sequence) into the carrier signal. Therefore, it is advantageous that the sequence, or the spread sequence, is known to the detector so that the same can detect the sequence, or spread sequence, existing in the carrier signal and so that the detector can hence extract the watermark information contained in the carrier signal. Therefore, every subsequently added embedder (conventionally) causes an update of the extractors. In other watermark methods, it is also sometimes necessitated that the detector knows certain information from the embedder for detection.

This requirement can, for example, be avoided when the stated information (in this example the spread sequences) is calculated from a fixed data amount (e.g. from an initial value) by means of an appropriate derivation function. A new embedder can, for example, apply the derivation function to the initial value as often as there are already allocated embedders and therefore also spread sequences.

In several cases, the value calculated in this manner (i.e. the value calculated from the initial value by applying the derivation function once or several times) cannot be used directly as a spread sequence. Hence, in a spread sequence, several requirements exist, e.g. with regard to the correlation characteristics and the spectrum. In several embodiments, the value calculated by applying the derivation function to the initial value can also serve as "seed" for generating the actual spread sequence. In other watermark methods (that, for example, do not use a spread sequence), the value obtained by applying the derivation function to the initial value once or several times can also serve as a base for a respective data modulation.

According to a further aspect, a further characteristic results by using so-called one-way functions for the derivation. Thus, for example, only the hierarchically lower value can be calculated from a derived value. Thereby, for example, access rights can be granted to the extractor. If a detector has knowledge, for example, of the "uppermost" initial value, it will then be able to extract all watermarks. A detector that knows, for example, only the value that was derivated twice as the initial value, cannot generate the two sequences (lying above) and hence it cannot read out the watermarks of two embedders. If, however, instead of a one-way function a normal derivation function (for example convertible with little computing effort) is used as the derivation function, a direct allocation of access rights will not be possible. However, there is the possibility of being able to obtain the sequence of an almost arbitrary amount of embedding parameter values or detection parameter values.

In the following, several improvements and advantages in relation to the prior art will be described, which can be obtained according to several embodiments of the present invention.

According to several embodiments described within the scope of the present invention, it is possible to embed several watermarks into a carrier signal or to read out several watermarks from a carrier signal. Thereby, for example, detection complexity can be reduced or minimized with respect to independent detection. According to several embodiments of the invention, memory requirements and/or energy requirements in a detection of watermarks are reduced.

In several embodiments of the invention it is possible to embed several watermarks into a carrier signal and to read them out in such a manner that only the watermarks are read out that are actually contained or that are free to be accessed. In several embodiments, useless detection efforts can be omitted.

In several embodiments, a detector does not have to know all embedder information necessitated for detection. Rather, in several embodiments, subsequently added embedders can be detected without having to update the detector.

Further, in several embodiments, a detector (or even every detector) can implicitly obtain access rights for these watermarks.

In the following, a further embodiment of the invention will be described. First, the embedding will be described. According to an embodiment, the embedder searches, for example, for existing watermarks in the carrier signal by searching for a synchronization sequence. Since the embedder (for example in the first embedding of a watermark into a carrier signal) is the first embedder, no such sequence is found. Therefore, the embedder, or the first embedder, inserts the synchronization sequence. Additionally, the embedder, or first embedder, can signalize that it is the first embedder. Thereby, the first embedder can also add the data (for example the signalization data indicating that it is the first embedder) (for example to the carrier signal). For example, the first embedder can add the data in an unoccupied time slot after the synchronization sequence or in a separate band in parallel to the synchronization sequence. In one embodiment, the data are added in parallel to the synchronization sequence.

In the following, a possible procedure in performing further embeddings is described. In this case, the embedder can again, for example, search for the known synchronization sequence. The known synchronization sequence can, moreover, be considered as an indication of the existence of watermarks. If the embedder finds the known synchronization sequence (for example during a further embedding), it can add, for example after signalizing the first embedder, information indicating that it is the second embedder. The respective data can again be added in parallel to the synchronization sequence. Further, the data can also be added to the carrier signal in a different manner, e.g. in a time slot following the synchronization sequence.

In the following, an exemplary procedure for detection will be described. A detector can search, for example, for the embedder information and finds (for example after the above-described embeddings) the synchronization signal and the signalizations from the first and second embedders. Hence, the detector derives, for example, the extraction parameters necessitated for detecting the watermark. Further, the detector extracts, for example, exactly these two watermark data. Since, for example, both watermarks (i.e. for example the watermark embedded by the first embedder and the watermark embedded by the further, or second, embedder) are based on the same synchronization signal, the synchronization is, for example, performed only once for all watermarks. Further, no further watermarks need to be searched for.

In summary, it is to be stated that the present invention according to several aspects provides an apparatus and a method for multiple watermark embedding and watermark extraction. Several embodiments of the invention solve the object to enable multiple watermark embedding into carrier data, or a carrier signal, such that detection with limited complexity or with lower complexity than with conventional arrangements is possible.

The respective concept can be used advantageously, since it is desired or even necessitated for the different cases of application to embed not only one single watermark but several independent watermarks. Moreover, most watermark methods are designed for embedding one watermark, even when the respective method basically allows multiple embedding.

Conventionally, detection complexity and memory requirements increase uniformly with a number of possible watermarks. Further, conventionally, a detector usually has no information on how many and what watermarks actually exist in carrier signals. Hence, it has to attempt, for example, to detect all possible watermarks.

According to one aspect of the embodiments described in the present specification, the carrier signal is examined for possibly existing watermarks prior to every embedding process. If an already existing watermark is detected, the new watermarks will be inserted independent of the original watermark in a manner enabling the detector to use common methods for all watermarks equally.

According to a further aspect of several of the embodiments described herein, embedding of additional information providing both the extractor with information on the original embedders and providing a further embedder with information on every further (or previous) embedding process, can take place. An extraction method for this information can, for example, be independent of the embedder.

According to a further aspect of several of the embodiments described herein, the embedder-dependent information is not selected arbitrarily but derived from each other in a defined manner.

In the following, several methods according to different embodiments of the invention will be described.

Figure 11:
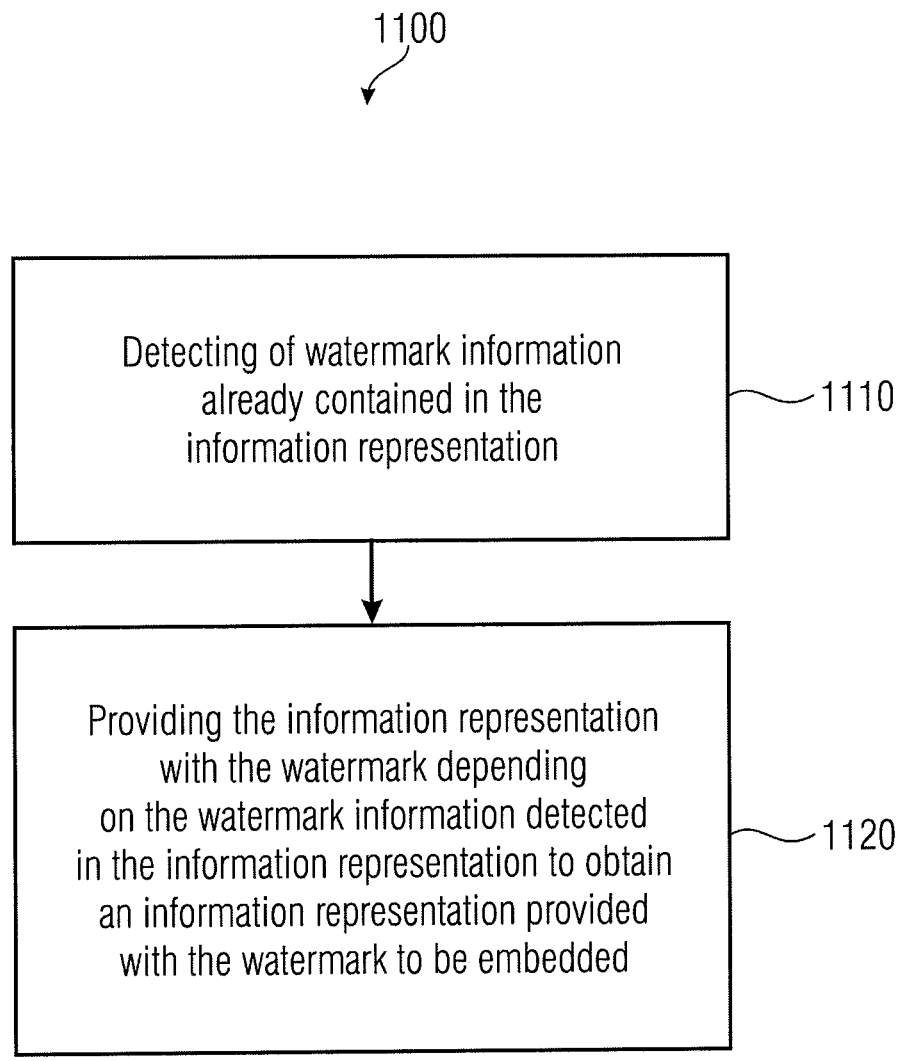
FIG. 11 shows a flowchart of a method for embedding a watermark according to an embodiment of the invention.

FIG. 11 shows a flow diagram of a method of embedding a watermark to be embedded into an information representation. The method according to FIG. 11 is indicated by 1100 in its entirety. In a first step 1110, the method 1100 comprises detecting watermark information already contained in the information representation. Further, in the second step 1120, the method 1100 comprises providing the information representation with the watermark depending on the watermark information detected in the information representation, to obtain an information representation provided with the watermark to be embedded.

Figure 12:
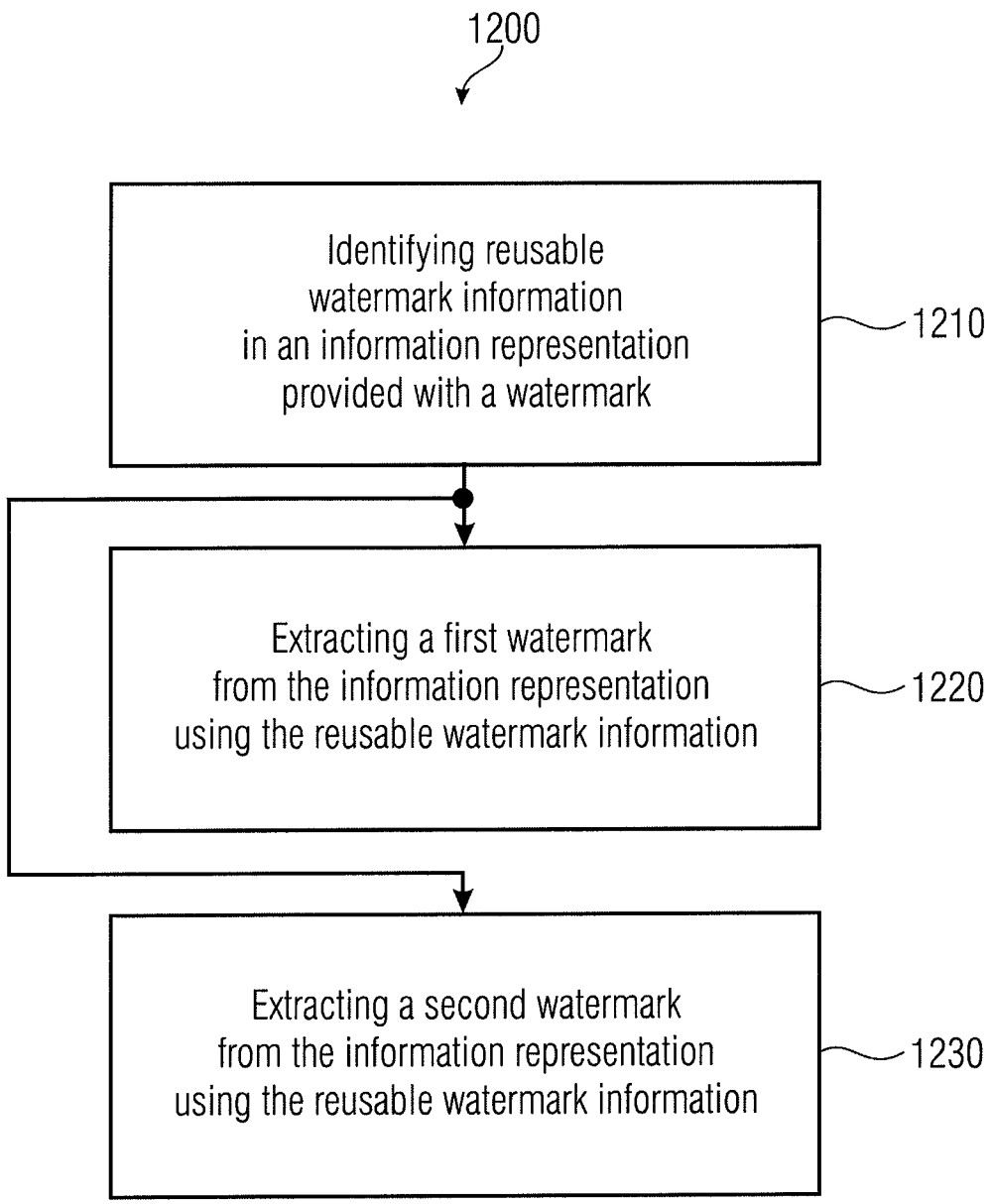
FIG. 12 shows a flowchart of a method for detecting a watermark according to an embodiment of the invention.

FIG. 12 shows a flow diagram of a method of detecting at least two watermarks in an information representation provided with watermarks. The method according to FIG. 12 is indicated by 1200 in its entirety. In a first step 1210, the method 1200 comprises identifying reusable watermark information in the information representation provided with a watermark. Further, in a second step 1220, the method 1210 comprises extracting a first watermark from the information representation using the reusable watermark information. Further, in a third step 1230, the method 1200 comprises extracting a second watermark from the information representation using the reusable watermark information.

Further, the second step 1220 and the third step 1230 can be performed one after the other. Alternatively, the second step 1220 and the third step 1230 can also be performed in parallel, simultaneously or at least in a temporally overlapping manner.

Figure 13:
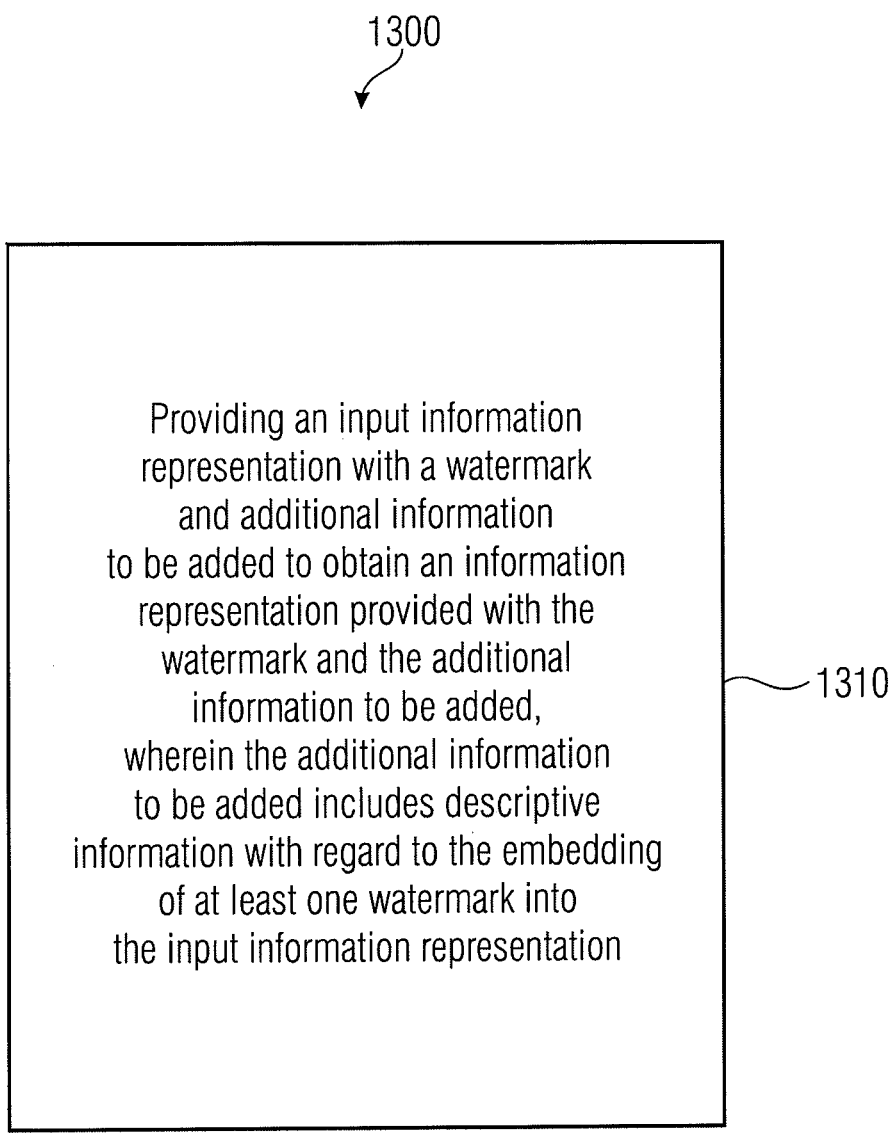
FIG. 13 shows a graphical illustration of a step for embedding a watermark according to an embodiment of the invention.

FIG. 13 shows a graphical illustration of a method of embedding a watermark to be embedded into an input information representation. The method according to FIG. 13 is indicated by 1300 in its entirety. The method 1300 comprises providing 1310 the input information representation with a watermark and additional information to be added to obtain an information representation provided with the watermark and the additional information to be added. The additional information to be added comprises descriptive information with regard to the embedding of at least one watermark into the input information representation.

Figure 14:
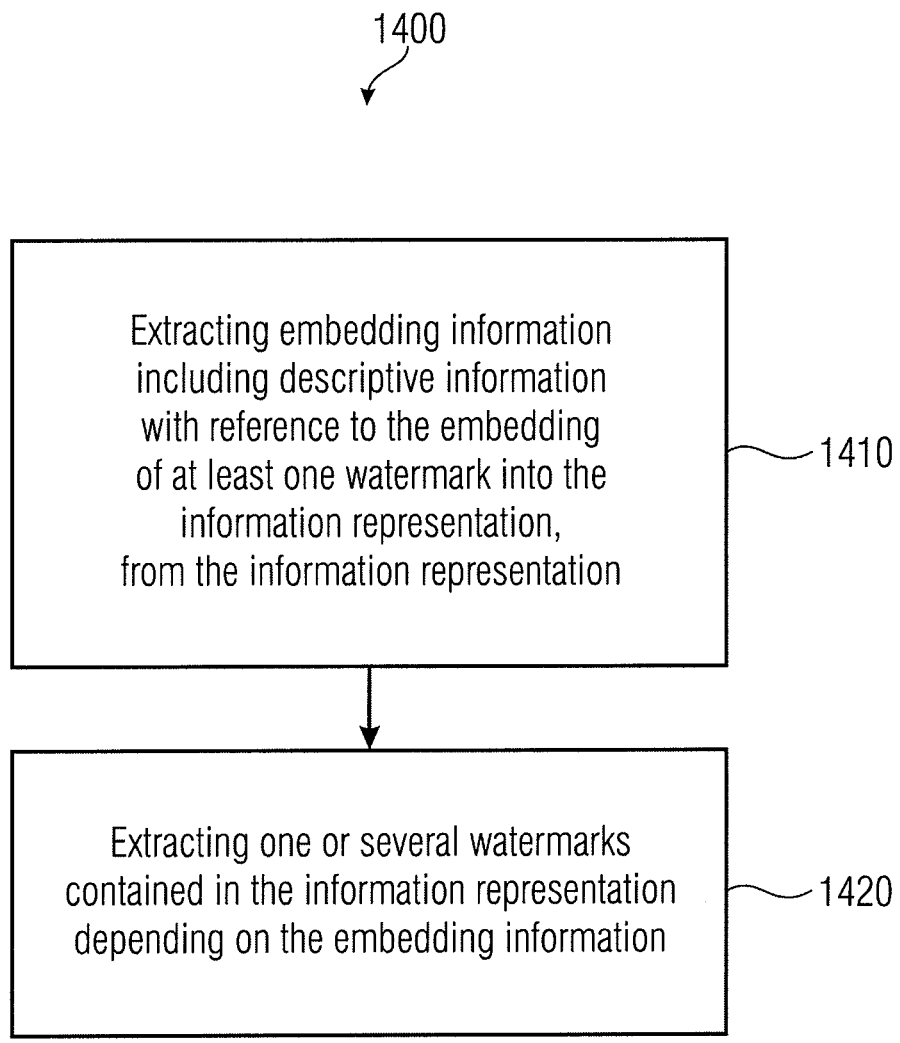
FIG. 14 shows a flowchart of a method for detecting a watermark according to an embodiment of the invention.

FIG. 14 shows a flow diagram of a method of detecting at least one watermark in an input information representation. The method according to FIG. 14 is indicated by 1400 in its entirety. In a first step 1410, the method 1400 comprises extracting embedding information including descriptive information with regard to the embedding of at least one watermark into the information representation, from the information representation. Further, in a second step 1420, the method 1400 comprises extracting one or several watermarks contained in the input information representation depending on the embedding information.

Figure 15:
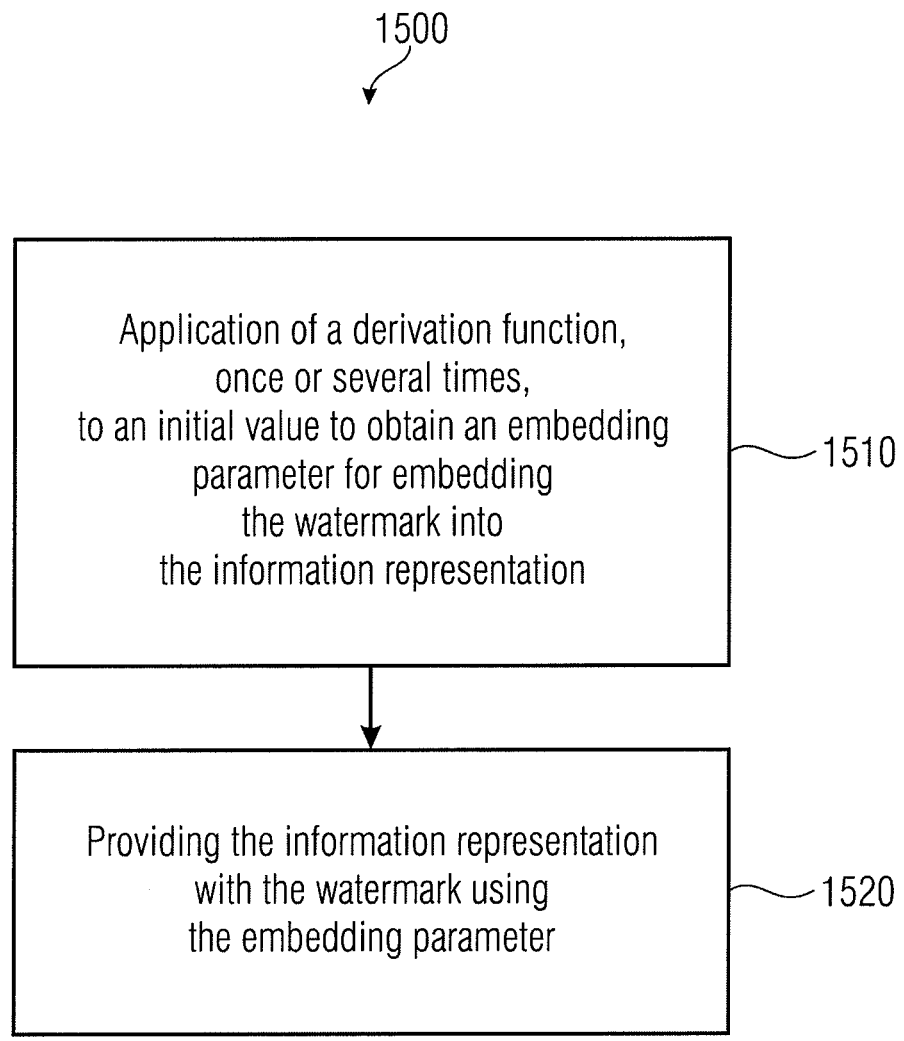
FIG. 15 shows a flowchart of a method for embedding a watermark according to an embodiment of the invention.

FIG. 15 shows a flow diagram of a method of embedding a watermark into an information representation. The method according to FIG. 15 is indicated by 1500 in its entirety. In a first step 1510, the method 1500 comprises applying a derivation function, once or several times, to an initial value to obtain an embedding parameter for embedding the watermark into the information representation. Further, in a second step 1520, the method 1500 comprises providing the information representation with the watermark using the embedding parameter.

Figure 16:
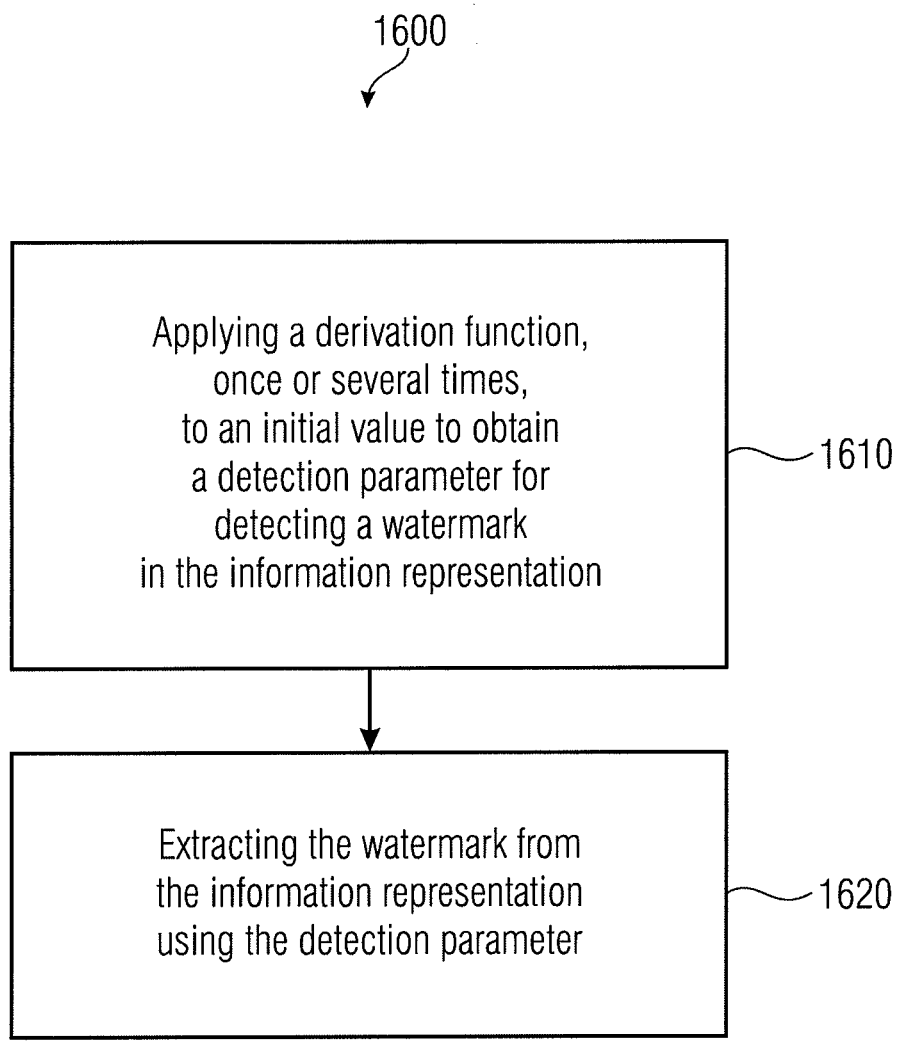
FIG. 16 shows a flowchart of a method for detecting a watermark according to an embodiment of the invention.

FIG. 16 shows a flow diagram of a method of detecting at least one watermark in the information representation provided with the watermark. The method according to FIG. 16 is indicated by 1600 in its entirety. In a first step 1610, the method 1600 comprises applying a derivation function, once or several times, to an initial value to obtain a detection parameter for detecting the watermark in the information representation. Further, in a second step 1620, the method 1600 comprises extracting the watermark from the information representation using the detection parameter.

The methods 1200-1600 according to FIGS. 12-16 can further be supplemented by all those steps and/or features discussed within the present description also with regard to the described apparatuses. Further, the method illustrated within the present description may also be realized by a computer program.

In other words, the inventive apparatus and the inventive method can be implemented in hardware or in software. Implementation can be made on a digital memory medium, for example a disc, a CD, a DVD, an ROM, a PROM, an EPROM, an EEPROM or a FLASH memory with electronically readable control signals that can cooperate with a programmable computer system such that the respective method is performed.

Generally, the present invention consists therefore also of a computer program product with a program code stored on a machine-readable carrier for performing the inventive method when the computer program product runs on a computer. In other words, the invention can be realized as a computer program with a program code for performing the inventive method when the computer program runs on a computer.

According to one embodiment, the invention provides an embedder 300; 700 for embedding a watermark 341; 742 to be embedded into an input information representation 310; 710 representing an audio signal, or representing a video signal, or representing a computer program, or representing an image, or representing a text, comprising: an information adder 330; 740 implemented to provide the input information representation 310; 710 with the watermark 341; 742 to be embedded and additional information 343; 762 to be added to obtain an information representation 320; 720 provided with the watermark to be embedded and the additional information to be added, wherein the additional information to be added comprises descriptive information describing the embedding of at least one watermark into the information representation 320; 720 provided with the watermark to be embedded and the additional information; wherein the embedder is implemented to provide the input information representation 310; 710 with the additional information 343; 762 to be added such that the additional information to be added carries information on how many watermarks are contained in the information representation 320; 720 provided with the watermark to be embedded and the additional information to be added.

In an embodiment of the embedder 300; 700, the information adder 330; 740 comprises a watermark adder 340; 340*b*; 340*c* implemented to provide the input information representation or information derived therefrom with the watermark 341; 742 to be embedded, and an additional information adder 342; 342*b*; 342*c* implemented to provide the input information representation or information derived therefrom with the additional information to be added, wherein the watermark adder 340; 340*b*; 340*c* and the additional information adder 342; 342*b*; 342*c* are configured to cooperate in order to generate, during operation, an information representation provided with the watermark 341; 742 to be embedded and the additional information 342; 762 to be added.

In an embodiment of the embedder 300; 700, the embedder is implemented to provide the input information representation 310; 710 with additional information 343; 762 to be added such that the additional information to be added signalizes the existence of the watermark 341; 742 to be embedded in the information representation 320; 720 provided with the watermark to be embedded and the additional information to be added.

In an embodiment of the embedder 300; 700, the embedder is implemented to provide the input information representation 310; 710 with the additional information 343; 762 to be added such that the additional information to be added carries information on how many watermarks are contained in the information representation 320; 720 provided with the watermark to be embedded and the additional information to be added.

In an embodiment of the embedder 300; 700, the embedder is implemented to provide the input information representation 310; 710 with the additional information 343; 662 to be added such that the additional information to be added encodes at least one parameter used by the information adder 330; 740 when providing the input information representation with the watermark to be embedded.

In an embodiment of the embedder 300; 700, the embedder is implemented to provide the input information representation with the additional information 343; 762 to be added such that the additional information 343; 762 to be added depends on a watermark contained in the input information representation 310; 710.

According to an embodiment, the invention provides an embedder 300; 700 for embedding a watermark 341; 742 to be embedded into an input information representation 310; 710 representing an audio signal, or representing a video signal, or representing a computer program, or representing an image, or representing a text, comprising: an information adder 330; 740 implemented to provide the input information representation 310; 710 with the watermark 341; 742 to be embedded and additional information 343; 762 to be added to obtain an information representation 320; 720 provided with the watermark to be embedded and the additional information to be added, wherein the additional information to be added comprises descriptive information describing the embedding of at least one watermark into the information representation 320; 720 provided with the watermark to be embedded and the additional information; wherein the embedder comprises a watermark information detector 730, which is implemented to detect an existence of a watermark in the input information representation 310; 710, and to provide information on an existence of a watermark in the input information representation; and wherein the embedder is implemented to determine the additional information 343; 762 to be added depending on the information on the existence of a watermark in the input information representation 310; 710.

In an embodiment of the embedder 300; 700, the watermark information detector 730 is implemented to detect the existence of a watermark synchronization sequence in the input information representation 310; 710, and, when a watermark synchronization sequence exists in the input information representation, to provide information indicating the existence of at least one watermark in the input information representation.

In an embodiment of the embedder 300; 700, the watermark information detector 730 is implemented to detect, in the input information representation 310; 710, an existence of additional information describing an embedding of a watermark existing in the input information representation, and, when additional information exists in the input information representation, to provide, as the information on the existence of a watermark, information based on the additional information existing in the input information representation.

In an embodiment of the embedder 300; 700, the information adder 330; 740 is implemented to add the additional information 341; 762 to be added to the input information representation 310; 710 in an additional information block, which is adjacent to a synchronization information block.

In an embodiment of the embedder 300; 700, the information adder 330; 740 is implemented to add the additional information 341; 762 to be added in a timeslot following synchronization information contained in the input information representation 310; 710.

According to one embodiment, the invention provides an embedder 300; 700 for embedding a watermark 341; 742 to be embedded into an input information representation 310; 710 representing an audio signal, or representing a video signal, or representing a computer program, or representing an image, or representing a text, comprising: an information adder 330; 740 implemented to provide the input information representation 310; 710 with the watermark 341; 742 to be embedded and additional information 343; 762 to be added to obtain an information representation 320; 720 provided with the watermark to be embedded and the additional information to be added, wherein the additional information to be added comprises descriptive information describing the embedding of at least one watermark into the information representation 320; 720 provided with the watermark to be embedded and the additional information; wherein the embedder is implemented to select resources for embedding the watermark 341; 742 to be embedded depending on information on a number of watermarks already contained in the input information representation 310; 710.

In an embodiment of the embedder 300; 700, the embedder comprises an embedding parameter determiner 750, which is implemented to apply a derivation function depending on information on the number of watermarks already contained in the input information representation 310; 710, once or several times, to an initial value to obtain an embedding parameter for embedding the watermark into the input information representation, and wherein the information adder 330; 740 is implemented to provide the input information representation 310; 710 with the watermark to be embedded using the embedding parameter.

In an embodiment of the embedder 300; 700, the embedding parameter determiner 750 is implemented to use a value of the function obtained by applying the derivation function to the initial value, once or several times, as an initial value for calculating an embedding code according to a predetermined embedding code calculation regulation.

In an embodiment of the embedder 300; 700, the derivation function is a cryptographical one-way function.

An embodiment of the invention provides a detector 400; 800 for detecting at least one watermark in an input information representation 410; 810 representing an audio signal, or representing a video signal, or representing a computer program, or representing an image, or representing a text, comprising: an embedding information extractor, which is implemented to extract, from the input information representation, embedding information comprising descriptive information with regard to the embedding of at least one watermark into the input information representation; and a watermark extractor 630; 840, which is implemented to extract one or several watermarks contained in the input information representation 410; 810 depending on the embedding information; wherein the embedding information extractor 420; 830 is implemented to detect, as embedding information, additional information in the information representation 410; 810 comprising information on a number of watermarks embedded in the information representation, and wherein the detector is implemented to determine, depending on the additional information, how many watermarks are to be extracted from the input information representation.

In an embodiment of the detector 400; 800, the embedding information extractor 420; 830 is implemented to detect additional information in the information representation 410; 810 as embedding information, comprising information with regard to embedding at least one watermark into the information representation, and wherein the detector is implemented to select at least one extraction parameter for extraction of at least one watermark contained in the input information representation 410; 810 depending on the information with regard to the embedding of at least one watermark.

In an embodiment of the detector 400; 800, the embedding information extractor 420; 830 is implemented to detect, as the embedding information, additional information in the input information representation 410; 810 describing an allocation of an extraction code to a watermark to be extracted from the input information representation 410; 810 by the watermark extractor 430; 840, and wherein the detector is implemented to select an extraction code for extracting the watermark to be extracted depending on the additional information.

In an embodiment of the detector 400; 800, the embedding information extractor 420; 830 is implemented to detect, as the embedding information, additional information in the input information representation 410; 810 comprising information on a number of watermarks embedded in the input information representation, and wherein the detector is implemented to determine, depending on the additional information, how many watermarks are to be extracted from the input information representation.

In an embodiment of the detector 400; 800, the embedding information extractor 420; 830 is implemented to identify several embedding information units in the input information representation 410; 810, wherein the embedding information units are allocated to different watermark embeddings in the input information representation; and wherein the embedding information extractor 420; 830 is implemented to select a latest embedding information unit from the plurality of identified embedding information units to derive the additional information from the latest embedding information unit.

In an embodiment of the detector 400; 800, the embedding information extractor 420; 830 is implemented to extract, as the embedding information, a watermark number belonging to the watermark to be extracted from the input information representation 410; 810; wherein the detector comprises a detection parameter determiner 850, which is implemented to apply a derivation function depending on the watermark number, once or several times, to an initial value to obtain an extraction parameter for extracting the watermark to be extracted from the input information representation; and wherein the watermark extractor 430; 840 is implemented to extract the watermark to be extracted using the extraction parameter from the input information representation.

An embodiment of the invention provides an information signal 770, comprising at least one watermark and one descriptive information with regard to the embedding of the at least one watermark into the information signal, wherein the information signal comprises an audio signal, an image signal, a text signal or a computer program signal; and wherein the descriptive information is added in a timeslot following synchronization information contained in the input information representation 310; 710.

In an embodiment of the information signal 770, the descriptive information describes an allocation of a timeslot of the information signal to the at least one watermark, an allocation of a frequency band of the information signal to the at least one watermark, an allocation of an extraction code to the at least one watermark or a number of watermarks embedded in the information signal.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An embedder for embedding a watermark to be embedded into an input information representation representing an audio signal, or representing a video signal, or representing a computer program, or representing an image, or representing a text, comprising:
 an information adder implemented to provide the input information representation with the watermark to be embedded and additional information to be added to acquire an information representation provided with the watermark to be embedded and the additional information to be added,
 wherein the additional information to be added comprises descriptive information describing the embedding of at least one watermark into the information representation provided with the watermark to be embedded and the additional information;
 wherein the embedder is implemented to provide the input information representation with the additional information to be added such that the additional information to be added carries information on how many watermarks are comprised in the information representation provided with the watermark to be embedded and the additional information to be added.

2. An embedder for embedding a watermark to be embedded into an input information representation representing an audio signal, or representing a video signal, or representing a computer program, or representing an image, or representing a text, comprising:
 an information adder implemented to provide the input information representation with the watermark to be embedded and additional information to be added to acquire an information representation provided with the watermark to be embedded and the additional information to be added,
 wherein the additional information to be added comprises descriptive information describing the embedding of at least one watermark into the information representation provided with the watermark to be embedded and the additional information;
 wherein the embedder comprises a watermark information detector, which is implemented to detect an existence of a watermark in the input information representation, and to provide information on an existence of a watermark in the input information representation; and
 wherein the embedder is implemented to determine the additional information to be added depending on the information on the existence of a watermark in the input information representation.

3. The embedder according to claim 2, wherein the watermark information detector is implemented to extract, when additional information exists in the input information representation, information describing the number of watermarks comprised in the input information representation from the existing additional information, and
 wherein the embedder is implemented to determine the additional information to be added such that the additional information to be added describes, based on the information on the number of watermarks comprised in the input information representation, a number of comprised watermarks after adding the watermark to be added in the information representation provided with the watermark to be embedded and the additional information to be added.

4. An embedder for embedding a watermark to be embedded into an input information representation representing an audio signal, or representing a video signal, or representing a computer program, or representing an image, or representing a text, comprising:
 an information adder implemented to provide the input information representation with the watermark to be embedded and additional information to be added to acquire an information representation provided with the watermark to be embedded and the additional information to be added,
 wherein the additional information to be added comprises descriptive information describing the embedding of at least one watermark into the information representation provided with the watermark to be embedded and the additional information;
 wherein the information adder is implemented to add the additional information to be added to the input information representation in the same embedding format in which additional information already existing in the input information representation exists.

5. An embedder for embedding a watermark to be embedded into an input information representation representing an audio signal, or representing a video signal, or representing a computer program, or representing an image, or representing a text, comprising:
 an information adder implemented to provide the input information representation with the watermark to be embedded and additional information to be added to acquire an information representation provided with the watermark to be embedded and the additional information to be added,
 wherein the additional information to be added comprises descriptive information describing the embedding of at least one watermark into the information representation provided with the watermark to be embedded and the additional information;

wherein the embedder comprises a watermark information detector, which is implemented to detect watermark information already comprised in the input information representation, and wherein the information adder is implemented to provide the input information representation with the watermark, depending on the watermark information detected by the watermark information detector.

6. An embedder for embedding a watermark to be embedded into an input information representation representing an audio signal, or representing a video signal, or representing a computer program, or representing an image, or representing a text, comprising:

an information adder implemented to provide the input information representation with the watermark to be embedded and additional information to be added to acquire an information representation provided with the watermark to be embedded and the additional information to be added, wherein the additional information to be added comprises descriptive information describing the embedding of at least one watermark into the information representation provided with the watermark to be embedded and the additional information;

wherein the embedder is implemented to select resources for embedding the watermark to be embedded depending on information on a number of watermarks already comprised in the input information representation.

7. A detector for detecting at least one watermark in an input information representation representing an audio signal, or representing a video signal, or representing a computer program, or representing an image, or representing a text, comprising:

an embedding information extractor, which is implemented to extract, from the input information representation, embedding information comprising descriptive information with regard to the embedding of at least one watermark into the input information representation; and a watermark extractor, which is implemented to extract one or several watermarks comprised in the input information representation depending on the embedding information;

wherein the embedding information extractor is implemented to detect, as embedding information, additional information in the information representation comprising information on a number of watermarks embedded in the information representation, and wherein the detector is implemented to determine, depending on the additional information, how many watermarks are to be extracted from the input information representation.

8. A method of embedding a watermark to be embedded into an input information representation representing an audio signal, or representing a video signal, or representing a computer program, or representing an image, or representing a text, comprising:

providing the input information representation with a watermark and additional information to be added to acquire an information representation provided with the watermark and additional information to be added, wherein the additional information to be added comprises descriptive information with regard to embedding at least one watermark into the input information representation;

wherein the input information representation is provided with the additional information to be added such that the additional information to be added carries information on how many watermarks are comprised in the information representation provided with the watermark to be embedded and the additional information to be added.

9. A method of embedding a watermark to be embedded into an input information representation representing an audio signal, or representing a video signal, or representing a computer program, or representing an image, or representing a text, comprising:

providing the input information representation with a watermark and additional information to be added to acquire an information representation provided with the watermark and additional information to be added, wherein the additional information to be added comprises descriptive information with regard to embedding at least one watermark into the input information representation;

wherein an existence of a watermark is detected in the input information representation, and information on an existence of a watermark in the input information representation is provided; and wherein the additional information to be added is determined depending on the information on the existence of a watermark in the input information representation.

10. A method of embedding a watermark to be embedded into an input information representation representing an audio signal, or representing a video signal, or representing a computer program, or representing an image, or representing a text, comprising:

providing the input information representation with a watermark and additional information to be added to acquire an information representation provided with the watermark and additional information to be added, wherein the additional information to be added comprises descriptive information with regard to embedding at least one watermark into the input information representation;

wherein the additional information to be added is added to the input information representation in the same embedding format in which additional information already existing in the input information representation exists.

11. A method of embedding a watermark to be embedded into an input information representation representing an audio signal, or representing a video signal, or representing a computer program, or representing an image, or representing a text, comprising:

providing the input information representation with a watermark and additional information to be added to acquire an information representation provided with the watermark and additional information to be added, wherein the additional information to be added comprises descriptive information with regard to embedding at least one watermark into the input information representation;

wherein watermark information already comprised in the input information representation is detected, and wherein the input information representation is provided with the watermark, depending on the detected watermark information.

12. A method of embedding a watermark to be embedded into an input information representation representing an audio signal, or representing a video signal, or representing a computer program, or representing an image, or representing a text, comprising:

provide the input information representation with a watermark and additional information to be added to acquire an information representation provided with the watermark and additional information to be added, wherein the additional information to be added comprises descriptive information with regard to embedding at least one watermark into the input information representation;

wherein resources for embedding the watermark to be embedded are selected depending on information on a number of watermarks already comprised in the input information representation.

13. A method of detecting at least one watermark in an input information representation representing an audio signal, or representing a video signal, or representing a computer program, or representing an image, or representing a text, comprising:

extracting embedding information comprising descriptive information with regard to the embedding of at least one watermark into the input information representation, from the input information representation; and extracting one or several watermarks comprised in the input information representation depending on the embedding information;

wherein, as embedding information, additional information in the information representation is detected, comprising information on a number of watermarks embedded in the input information representation, and wherein it is determined, depending on the additional information, how many watermarks are to be extracted from the input information representation.

14. A non-transitory digital memory medium, comprising an information signal, comprising at least one watermark and one descriptive information with regard to the embedding of the at least one watermark into the information signal;

wherein the information signal comprises an audio signal, an image signal, a text signal or a computer program signal; and wherein the descriptive information carries information on how many watermarks are comprised in the information signal.

15. An embedder for embedding a watermark to be embedded into an input information representation representing an audio signal, or representing a video signal, or representing a computer program, or representing an image, or representing a text, comprising:

an information adder implemented to provide the input information representation with the watermark to be embedded and additional information to be added to acquire an information representation provided with the watermark to be embedded and the additional information to be added, wherein the additional information to be added comprises descriptive information describing the embedding of at least one watermark into the information representation provided with the watermark to be embedded and the additional information;

wherein the information adder is implemented to add the additional information to be added in a timeslot following synchronization information comprised in the input information representation.

16. The embedder according to claim 15, wherein the information adder is implemented to add the additional information to be added to the input information representation in a separate frequency band overlapping in time with synchronization information.

17. A detector for detecting at least one watermark in an input information representation representing an audio signal, or representing a video signal, or representing a computer program, or representing an image, or representing a text, comprising:

an embedding information extractor, which is implemented to extract, from the input information representation, embedding information comprising descriptive information with regard to the embedding of at least one watermark into the input information representation; and a watermark extractor, which is implemented to extract one or several watermarks comprised in the input information representation depending on the embedding information;

wherein the embedding information extractor is implemented to identify several embedding information units in the input information representation, wherein the embedding information units are allocated to different watermark embeddings in the input information representation; and wherein the embedding information extractor is implemented to select a latest embedding information unit from the plurality of identified embedding information units, and to derive the additional information from the latest embedding information unit.

18. A detector for detecting at least one watermark in an input information representation representing an audio signal, or representing a video signal, or representing a computer program, or representing an image, or representing a text, comprising:

an embedding information extractor, which is implemented to extract, from the input information representation, embedding information comprising descriptive information with regard to the embedding of at least one watermark into the input information representation; and a watermark extractor, which is implemented to extract one or several watermarks comprised in the input information representation, depending on the embedding information;

wherein the embedding information extractor is implemented to extract, as the embedding information, a watermark number belonging to the watermark to be extracted, from the input information representation;

wherein the detector comprises a detection parameter determiner, which is implemented to apply a derivation function, depending on the watermark number, once or several times, to an initial value to acquire an extraction parameter for extracting the watermark to be extracted from the input information representation; and wherein the watermark extractor is implemented to extract the watermark to be extracted using the extraction parameter from the input information representation.

19. The detector according to claim 17, wherein the embedding information extractor is implemented to detect, as the embedding information, additional information in the input information representation describing an allocation of a timeslot of the input information representation to a watermark to be extracted from the input information representation by the watermark extractor, and wherein the detector is implemented to select a timeslot for the extraction of the watermark to be extracted depending on the additional information.

20. The detector according to claim 17, wherein the embedding information extractor is implemented to detect, as the embedding information, additional information in the input information representation describing an allocation of a frequency band of the input information representation to a watermark to be extracted from the input information representation by the watermark extractor, and
    wherein the detector is implemented to select a frequency band for the extraction of the watermark to be extracted depending on the additional information.

21. The detector according to claim 17, wherein the embedding information extractor is implemented to search for the additional information in a predefined timeslot of the input information representation following synchronization information in the input information representation.

22. The detector according to claim 17, wherein the embedding information extractor is implemented to identify several embedding information units in the input information representation describing different numbers of watermarks, and
    to select an embedding information unit describing a highest number of watermarks as latest embedding information unit.

23. The detector according to claim 18, wherein the watermark number indicates how often the derivation function is to be applied to the initial value.

24. The detector according to claim 18, wherein the derivation function is a cryptographical one-way function.

25. A method of embedding a watermark to be embedded into an input information representation representing an audio signal, or representing a video signal, or representing a computer program, or representing an image, or representing a text, comprising:
    providing the input information representation with a watermark and additional information to be added to acquire an information representation provided with the watermark and additional information to be added,
    wherein the additional information to be added comprises descriptive information with regard to embedding at least one watermark into the input information representation;
    wherein the additional information to be added is added in a timeslot following synchronization information comprised in the input information representation.

26. A method of detecting at least one watermark in an input information representation representing an audio signal, or representing a video signal, or representing a computer program, or representing an image, or representing a text, comprising:
    extracting embedding information comprising descriptive information with regard to the embedding of at least one watermark into the input information representation, from the input information representation; and
    extracting one or several watermarks comprised in the input information representation depending on the embedding information;
    wherein several embedding information units are identified in the input information representation, wherein the embedding information units are allocated to different watermark embeddings in the input information representation; and
    wherein a latest embedding information unit is selected from the plurality of identified embedding information units, and the additional information is derived from the latest embedding information unit.

27. A method of detecting at least one watermark in an input information representation representing an audio signal, or representing a video signal, or representing a computer program, or representing an image, or representing a text, comprising:
    extracting embedding information comprising descriptive information with regard to the embedding of at least one watermark into the input information representation, from the input information representation; and
    extracting one or several watermarks comprised in the input information representation, depending on the embedding information;
    wherein, as the embedding information, a watermark number belonging to the watermark to be extracted is extracted from the input information representation;
    wherein, depending on the watermark number, a derivation function is applied, once or several times, to an initial value to acquire an extraction parameter for extracting the watermark to be extracted from the input information representation; and
    wherein the watermark to be extracted is extracted using the extraction parameter from the input information representation.

28. A non-transitory digital memory medium comprising a computer program for performing a method according to one of claims 8 to 12 or 25, when the computer program runs on a computer.

29. A non-transitory digital memory medium, comprising an information signal, comprising at least one watermark and one descriptive information with regard to the embedding of the at least one watermark into the information signal;
    wherein the information signal comprises an audio signal, an image signal, a text signal or a computer program signal; and
    wherein the descriptive information is added in a timeslot following synchronization information comprised in the input information representation.

* * * * *

UNITED STATES PATENT AND TRADEMARK OFFICE
CERTIFICATE OF CORRECTION

PATENT NO.        : 8,625,839 B2
APPLICATION NO.   : 12/922644
DATED             : January 7, 2014
INVENTOR(S)       : Grill et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 297 days.

Signed and Sealed this
Twenty-second Day of September, 2015

Michelle K. Lee
*Director of the United States Patent and Trademark Office*